(12) United States Patent
Abe

(10) Patent No.: US 9,137,483 B2
(45) Date of Patent: Sep. 15, 2015

(54) VIDEO PLAYBACK DEVICE, VIDEO PLAYBACK METHOD, NON-TRANSITORY STORAGE MEDIUM HAVING STORED THEREON VIDEO PLAYBACK PROGRAM, VIDEO PLAYBACK CONTROL DEVICE, VIDEO PLAYBACK CONTROL METHOD AND NON-TRANSITORY STORAGE MEDIUM HAVING STORED THEREON VIDEO PLAYBACK CONTROL PROGRAM

(71) Applicant: CASIO COMPUTER CO., LTD., Shibuya-ku, Tokyo (JP)

(72) Inventor: Takatoshi Abe, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 89 days.

(21) Appl. No.: 14/133,189

(22) Filed: Dec. 18, 2013

(65) Prior Publication Data
US 2014/0178046 A1 Jun. 26, 2014

(30) Foreign Application Priority Data

Dec. 20, 2012 (JP) ................................ 2012-277567
Jun. 10, 2013 (JP) ................................ 2013-121380

(51) Int. Cl.
*H04N 9/80* (2006.01)
*H04N 5/93* (2006.01)
(Continued)

(52) U.S. Cl.
CPC .............. *H04N 5/9305* (2013.01); *G09B 5/065* (2013.01); *G09B 19/06* (2013.01); *G11B 27/105* (2013.01); *G11B 27/34* (2013.01)

(58) Field of Classification Search
CPC ....... H04N 5/9305; H04N 5/105; H04N 5/06; H04N 5/065; H04N 5/34

USPC .................. 386/239, 241, 244, 245, 248, 246
See application file for complete search history.

(56) References Cited

U.S. PATENT DOCUMENTS 8,745,683 B1 * 6/2014 Maeng ........................... 725/110
2006/0120692 A1 6/2006 Fukuta et al.

FOREIGN PATENT DOCUMENTS

JP 2004-185680 A 7/2004
JP 2007-219218 A 8/2007
(Continued)

OTHER PUBLICATIONS

Japanese Office Action dated Aug. 26, 2014, issued in counterpart Japanese Application No. 2013-121380.
(Continued)

*Primary Examiner* — Robert Chevalier
(74) *Attorney, Agent, or Firm* — Holtz, Holtz, Goodman & Chick PC

(57) ABSTRACT

A video playback device includes a storage unit, a sound-attached video playback control unit, a pause control unit, a text display control unit and a playback restart control unit. The sound-attached video playback control unit controls to play a sound-attached video on the basis of a user operation. The pause control unit controls to pause the sound-attached video on the basis of a user operation while the sound-attached video is played. When the sound-attached video is paused, the text display control unit controls to read from the storage unit a text correlated with a sound-attached video portion including a point at which the sound-attached video is paused to display the text. The playback restart control unit controls to restart the sound-attached video from the paused point on the basis of a user operation.

13 Claims, 13 Drawing Sheets

(51) Int. Cl.
*G11B 27/10* (2006.01)
*G11B 27/34* (2006.01)
*G09B 5/06* (2006.01)
*G09B 19/06* (2006.01)

(56) References Cited

FOREIGN PATENT DOCUMENTS

| | | |
|---|---|---|
| JP | 2010161544 A | 7/2010 |
| JP | 2010-262090 A | 11/2010 |
| JP | 2011244487 A | 12/2011 |
| WO | 2010131493 A1 | 11/2010 |

OTHER PUBLICATIONS

Japanese Office Action dated Aug. 26, 2014, issued in Japanese Application No. 2013-121379.

U.S. Appl. No. 14/133,136, filed Dec. 18, 2013, First Named Inventor: Takatoshi Abe, Title: "Video Playback Device, Video Playback Method, Non-Transitory Storage Medium Having Stored Thereon Video Playback Program, Video Playback Control Device, Video Playback Control Method and Non-Transitory Storage Medium Having Stored Thereon Video Playback Control Program".

* cited by examiner

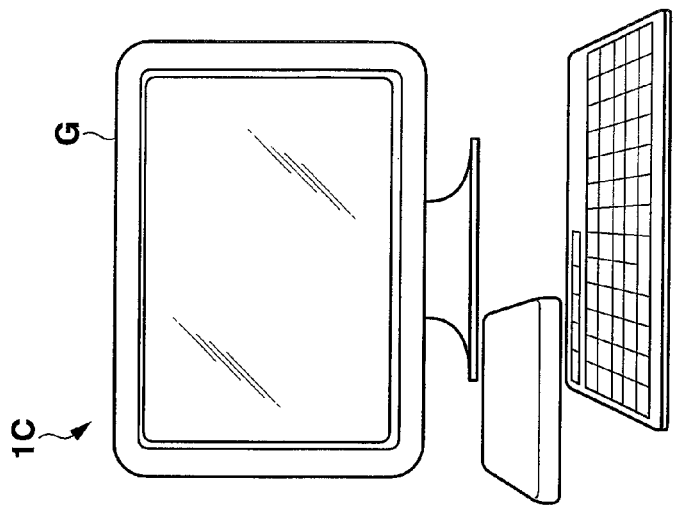
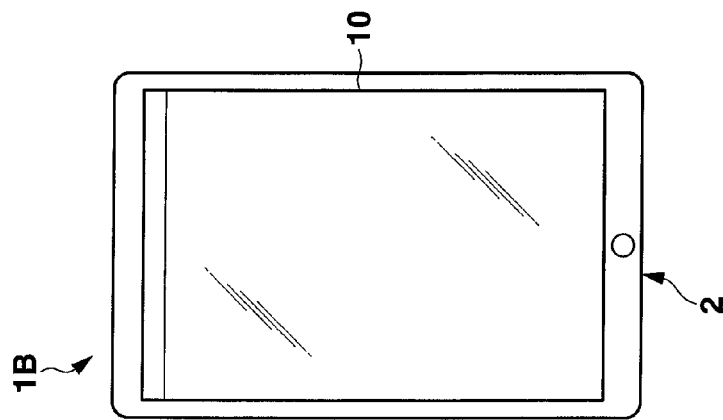
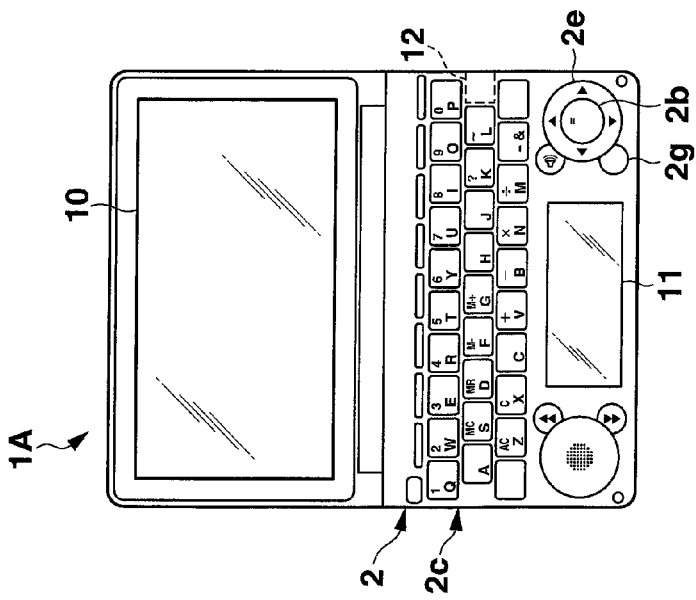

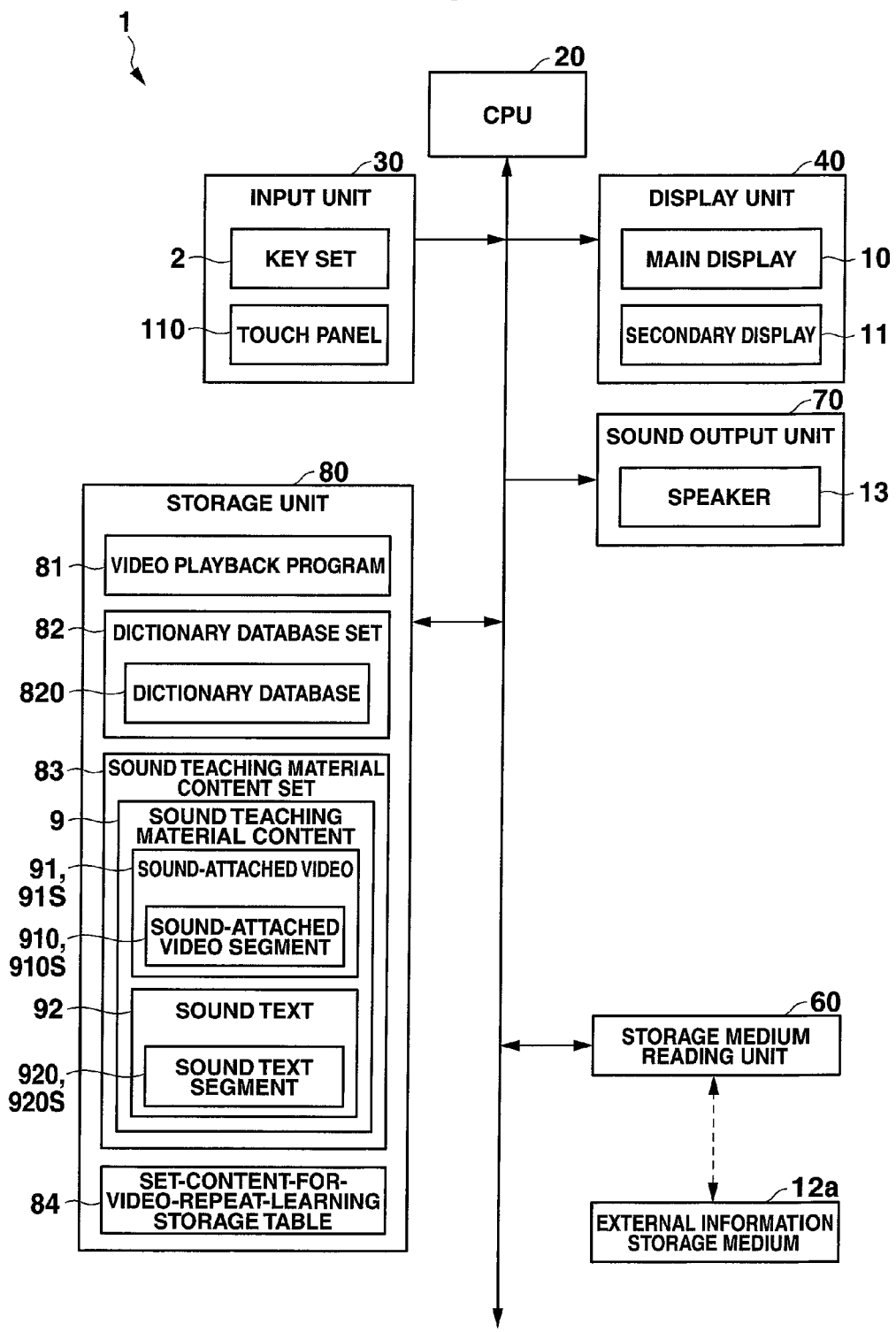

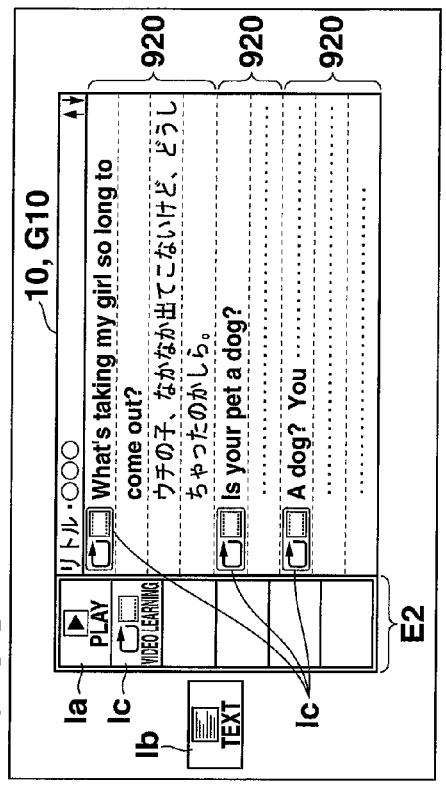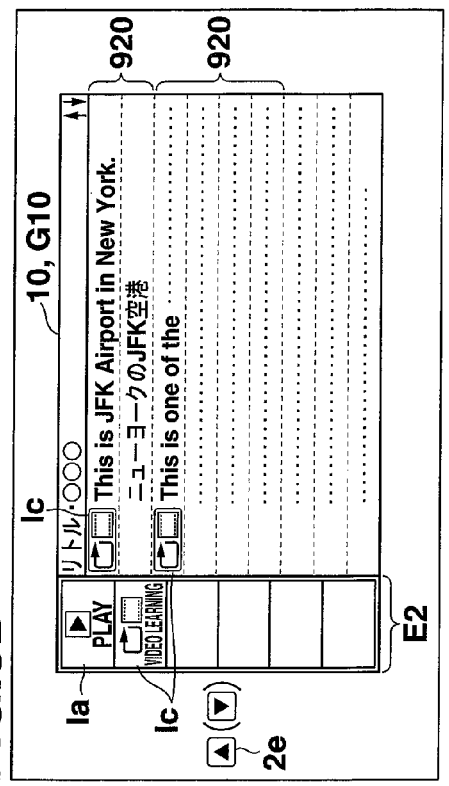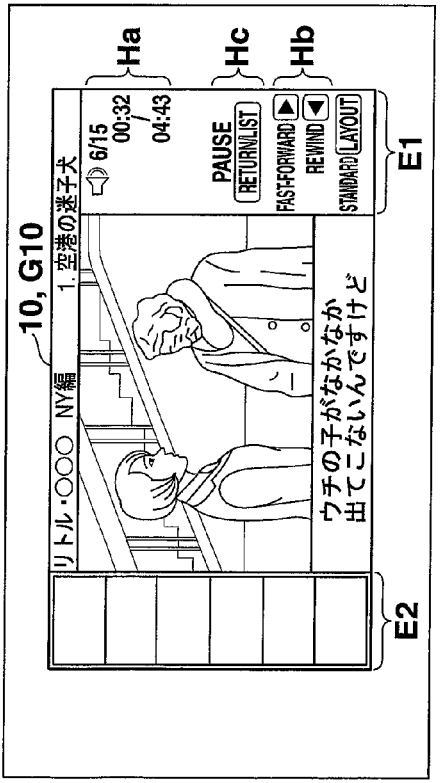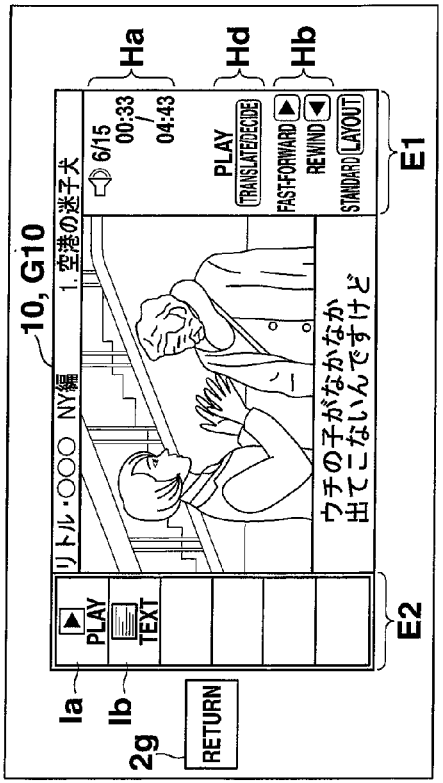

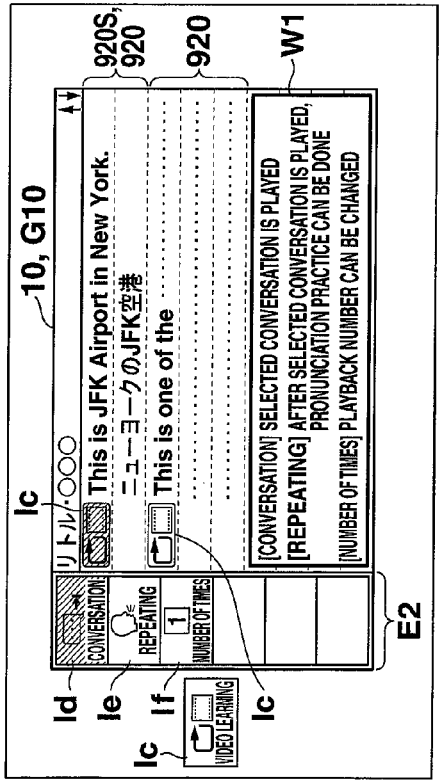

VIDEO PLAYBACK DEVICE, VIDEO PLAYBACK METHOD, NON-TRANSITORY STORAGE MEDIUM HAVING STORED THEREON VIDEO PLAYBACK PROGRAM, VIDEO PLAYBACK CONTROL DEVICE, VIDEO PLAYBACK CONTROL METHOD AND NON-TRANSITORY STORAGE MEDIUM HAVING STORED THEREON VIDEO PLAYBACK CONTROL PROGRAM

CROSS REFERENCE TO RELATED APPLICATION

This application is based upon and claims the benefit of priority under 35 USC 119 of Japanese Patent Applications No. 2012-277567 filed on Dec. 20, 2012 and No. 2013-121380 filed on Jun. 10, 2013, the entire disclosure of which, including the descriptions, claims, drawings, and abstracts, is incorporated herein by reference in its entirety.

BACKGROUND OF THE INVENTION

1. Field of the Invention

The present invention relates to a video playback device, a video playback method, a video playback control device, a video playback control method and so forth.

2. Background Art

A device which can output sounds has been used for language learning. This kind of device can output model sounds multiple times and/or compare the model sounds with user's sounds. (For example, refer to Japanese Patent Application Laid-Open Publication No. 2010-262090.)

In recent years, this kind of device is provided with a display device, and when a user performs an operation to pause a sound-attached video which is being played, the meaning of a word the sound of which has just been output is displayed on the display device, and then the sound-attached video restarts from the paused point. (For example, refer to Japanese Patent Application Laid-Open Publication No. 2007-219218.) Further, this kind of device is configured to turn on and off subtitles (same language subtitles) in the language of the sounds of a sound-attached video, whereby a user can study by watching and listening to the sound-attached video with the same language subtitles displayed on the display device.

SUMMARY OF THE INVENTION

However, watching and listening to a sound-attached video while looking at the same language subtitles is as if a user answers a question while looking at its answer. Hence, a learning effect is low.

As a learning method which solves such a problem, for example, the following method may be used; a user studies by watching and listening to a sound-attached video without the same language subtitles displayed, and only when the user cannot understand the contents of the sounds (sound contents), the user plays the sound-attached video with the same language subtitles displayed. However, when a user studies with this method, the user needs to perform a complicated operation, namely, an operation to rewind a sound-attached video when the user comes across a part the sound content of which cannot be understood, play the sound-attached video with the same language subtitles from the not-understood part, and then play the sound-attached video without the same language subtitles from the following part.

Objects of the present invention include providing a video playback device, a video playback method, a non-transitory storage medium having stored thereon a video playback program, a video playback control device, a video playback control method and a non-transitory storage medium having stored thereon a video playback control program each of which can easily increase the learning effect of a sound-attached video which a user watches and listens to.

In order to achieve at least one of the objects, according to a first aspect of the present invention, there is provided a video playback device including: a sound-attached video storage unit in which a sound-attached video is stored; a text storage unit in which texts for sounds of sound-attached video portions of the sound-attached video are stored in such a way as to be correlated with the respective sound-attached video portions; a sound-attached video playback control unit which controls to play the sound-attached video on the basis of a user operation; a pause control unit which controls to pause the sound-attached video on the basis of a user operation while the sound-attached video is played by the sound-attached video playback control unit; a text display control unit which, when the sound-attached video is paused by the pause control unit, controls to read from the text storage unit a text correlated with a sound-attached video portion including a point at which the sound-attached video is paused by the pause control unit so as to display the text; and a playback restart control unit which controls to restart the sound-attached video from the paused point on the basis of a user operation.

In order to achieve at least one of the objects, according to a second aspect of the present invention, there is provided a video playback control device including: a sound-attached video obtaining unit which obtains sound-attached video portions of a sound-attached video; a text obtaining unit which obtains texts for sounds of the sound-attached video portions; a sound-attached video playback control unit which controls to play the sound-attached video on the basis of a user operation; a pause control unit which controls to pause the sound-attached video on the basis of a user operation while the sound-attached video is played by the sound-attached video playback control unit; a text display control unit which, when the sound-attached video is paused by the pause control unit, controls to obtain through the text obtaining unit a text correlated with a sound-attached video portion including a point at which the sound-attached video is paused by the pause control unit so as to display the text; and a playback restart control unit which controls to restart the sound-attached video from the paused point on the basis of a user operation.

BRIEF DESCRIPTION OF THE DRAWINGS

The present invention will become more fully understood from the detailed description given hereinafter and the appended drawings, which are given byway of illustration only, and thus are not intended as a definition of the limits of the present invention, wherein:

FIG. 1A is a plan view schematically showing an electronic dictionary according to an embodiment of the present invention;

FIG. 1B is a plan view schematically showing a tablet personal computer (or a smartphone);

FIG. 1C is a plan view schematically showing a personal computer connected to an external playback device;

FIG. 2 is a block diagram showing the internal configuration of the electronic dictionary;

FIGS. 8A to 8D show contents displayed on a display unit of the electronic dictionary;

FIGS. 9A to 9D show contents displayed on the display unit;

DETAILED DESCRIPTION OF THE PREFERRED EMBODIMENTS

Figure 3:
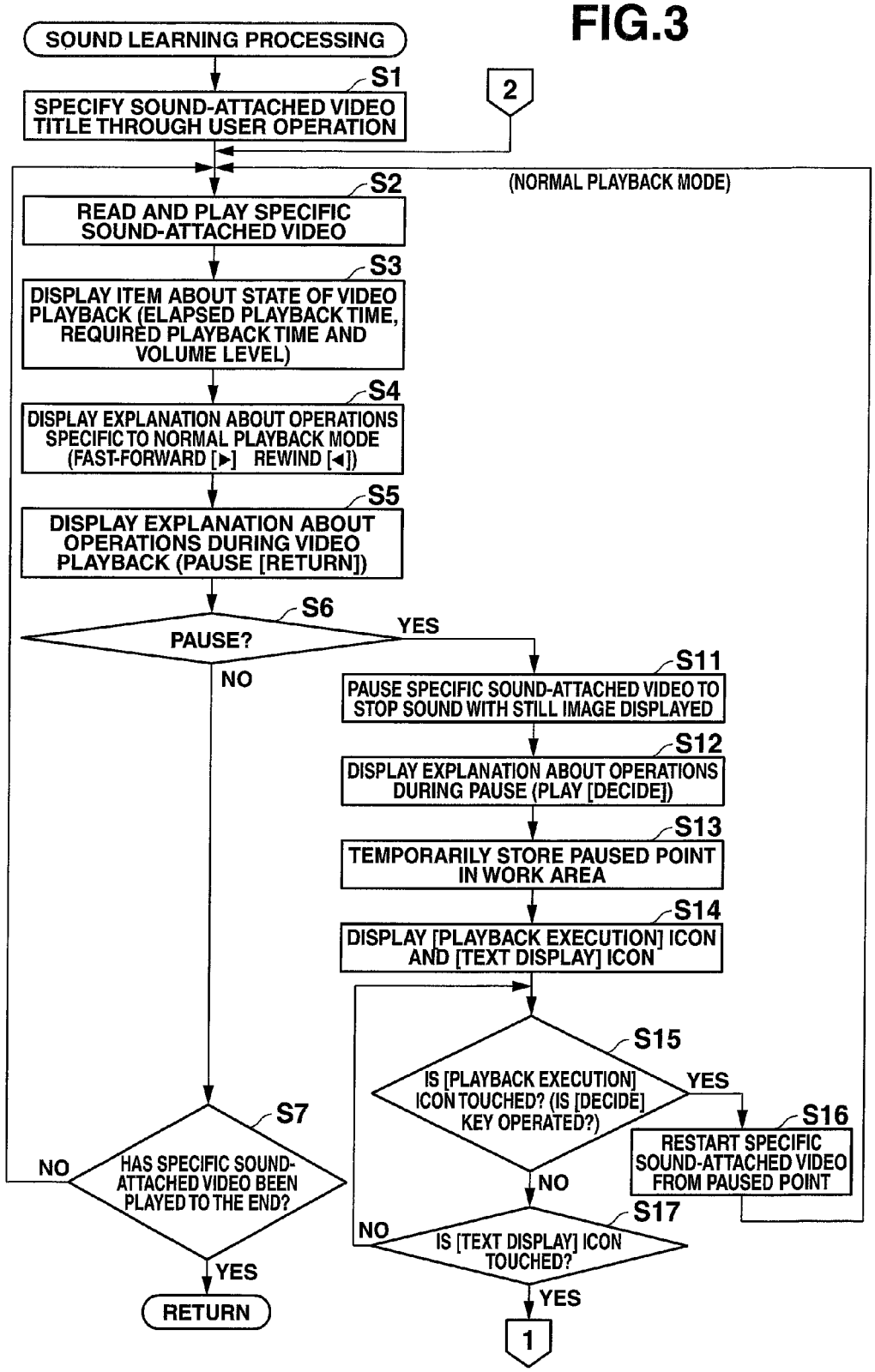
FIG. 3 is a flowchart of sound learning processing.

In the following, an embodiment in which a video playback device of the present invention is applied to an electronic dictionary is described with reference to the drawings in detail.

[External Configuration]

FIG. 1A is a plan view of an electronic dictionary 1.

As shown in FIG. 1A, the electronic dictionary 1 includes a main display 10, a secondary display 11, a card slot 12, a speaker 13 and a key set 2.

The main display 10 and the secondary display 11 display thereon various data such as letters and symbols in color on the basis of user operations with the key set 2 and are each constituted of, for example, an LCD (Liquid Crystal Display) or an ELD (Electronic Luminescence Display). In the embodiment, the main display 10 and the secondary display 11 are integrally formed with a touch panel 110 (see FIG. 2) to receive operations such as handwriting input.

An external information storage medium 12a (see FIG. 2) in which various pieces of information are stored is attachable/detachable to/from the card slot 12.

The speaker 13 outputs sounds on the basis of user operations with the key set 2.

The key set 2 includes various keys to receive operations to operate the electronic dictionary 1 from a user. More specifically, the key set 2 includes a decision key 2b, letter keys 2c, a cursor key 2e and a return key 2g.

The decision key 2b is used by a user, for example, to carry out search and decide a headword. The letter keys 2c are used by a user, for example, to input letters and are constituted of "A" to "Z" keys in the embodiment.

The cursor key 2e is used by a user, for example, to move a highlighted part displayed in a screen, namely, to move a cursor therein. In the embodiment, any of the up direction, the down direction, the left direction and the right direction can be specified with the cursor key 2e. The return key 2g is used by a user, for example, to return to screens previously displayed.

[Internal Configuration]

Next, the internal configuration of the electronic dictionary 1 is described. FIG. 2 is a block diagram showing the internal configuration of the electronic dictionary 1.

As shown in FIG. 2, the electronic dictionary 1 includes a display unit 40, an input unit 30, a sound output unit 70, a storage medium reading unit 60, a CPU (Central Processing Unit) 20 and a storage unit 80, and these units are connected to each other via a bus to perform data communication therebetween.

The display unit 40 includes the main display 10 and the secondary display 11, and the main display 10 and the secondary display 11 each display various pieces of information thereon on the basis of display signals input from the CPU 20.

The input unit 30 includes the key set 2 and the touch panel 110 and outputs signals corresponding to pressed keys or pressed points on the touch panel 110 to the CPU 20.

The sound output unit 70 includes the speaker 13, and the speaker 13 outputs sounds on the basis of sound output signals input from the CPU 20.

The storage medium reading unit 60 includes the card slot 12 and reads information from the external information storage medium 12a attached to the card slot 12 or stores (records) information in the external information storage medium 12a.

The external information storage medium 12a stores therein a dictionary database(s) 820 and a sound teaching material content(s) 9. The data structures of the dictionary database 820 and the sound teaching material content 9 are the same as those of a dictionary database 820 and a sound teaching material content 9 stored in the storage unit 80 described below, and hence details thereof are omitted herein.

The storage unit 80 is a memory in which programs and data to realize various functions of the electronic dictionary 1 are stored and which functions as a work area of the CPU 20. In the embodiment, the storage unit 80 stores a video playback program 81, a dictionary database set 82, a sound teaching material content set 83, a set-content-for-video-repeat-learning storage table 84 and the like.

The video playback program 81 is a program for the CPU 20 to perform sound learning processing (see FIGS. 3 to 5) described below.

The dictionary database set 82 includes a plurality of dictionary databases 820. The dictionary databases 820 each include a plurality of pieces of headword information in each of which a headword is correlated with its explanation information.

The sound teaching material content set 83 includes a plurality of sound teaching material contents 9.

The sound teaching material contents 9 each include a sound-attached video 91 and a sound text 92.

The sound-attached video 91 is a video including sounds and, in the embodiment, constituted of a plurality of sound-attached video segments 910 which are continuous in terms of time. In the embodiment, the sound-attached video 91 is divided by sentences (sentence by sentence) of the sounds included therein, whereby the sound-attached video segments 910 are formed.

The sound text 92 is text data corresponding to the sounds included in the sound-attached video 91 and is formed by converting the sounds into texts in the language of the sounds. In the embodiment, the sound text 92 is constituted of a plurality of sound text segments 920 corresponding to the sound-attached video segments 910 one-to-one. It is unnecessary that the content of each sound text segment 920 exactly match the sound content of its corresponding sound-attached video segment 910. Hence, the content of each sound text segment 920 may be an abbreviated version formed by omitting parts irrelative to learning (i.e. language learning) from the complete content thereof. Further, the sound text segments 920 may include, in addition to the texts in the language of the sounds included in the sound-attached video 91, texts translated from the texts in the language of the sounds to another language.

The set-content-for-video-repeat-learning storage table 84 stores therein the set contents of setting items for a learning mode (hereinafter a video repeat learning mode, see FIGS. 4 and 5) in which a predetermined sound-attached video segment 910 is played one or multiple times. In the embodiment, the setting items for the video repeat learning mode include a playback number and a with-or-without repetition. The playback number is a setting item about the number of times the predetermined sound-attached video segment 910 is played, and the with-or-without repetition is a setting item about whether or not a silent time for a user to do repetition is provided after each time the sound-attached video segment 910 is played. The silent time is provided when the with-or-without repetition is "ON", and the silent time is not provided when the with-or-without repetition is "OFF". In the embodiment, in the case in which the silent time is provided after each time a sound-attached video segment 910 is played, the sound text segment 920 for the sound-attached video segment 910 is displayed on the main display 10 during the silent time (Step S42 in FIG. 6 described below).

The CPU 20 performs various types of processing based on predetermined programs on the basis of commands input thereinto, transfers the commands and/or data to functional units and controls the electronic dictionary 1 as a whole. More specifically, the CPU 20 reads a program from various programs stored in the storage unit 80 on the basis of, for example, an operation signal input from the input unit 30 and performs processing in accordance with the read program. Then, the CPU 20 stores the result of the processing in the storage unit 80 and also outputs the result to the sound output unit 70 and/or the display unit 40 as needed.

[Action]

Next, the action of the electronic dictionary 1 is described with reference to the drawings.

[Sound Learning Processing]

Figure 4:
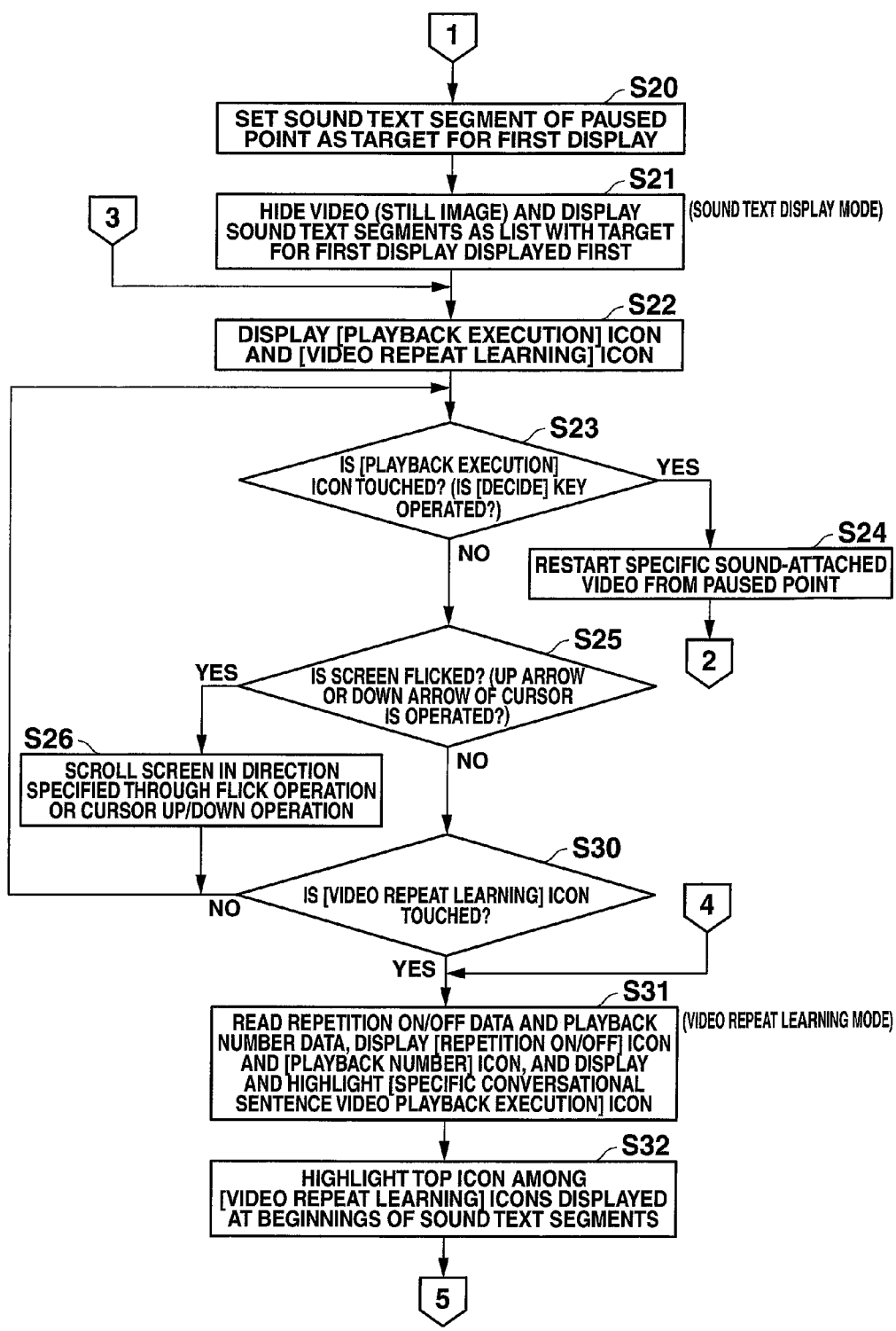
FIG. 4 is a flowchart of the sound learning processing.
Figure 5:
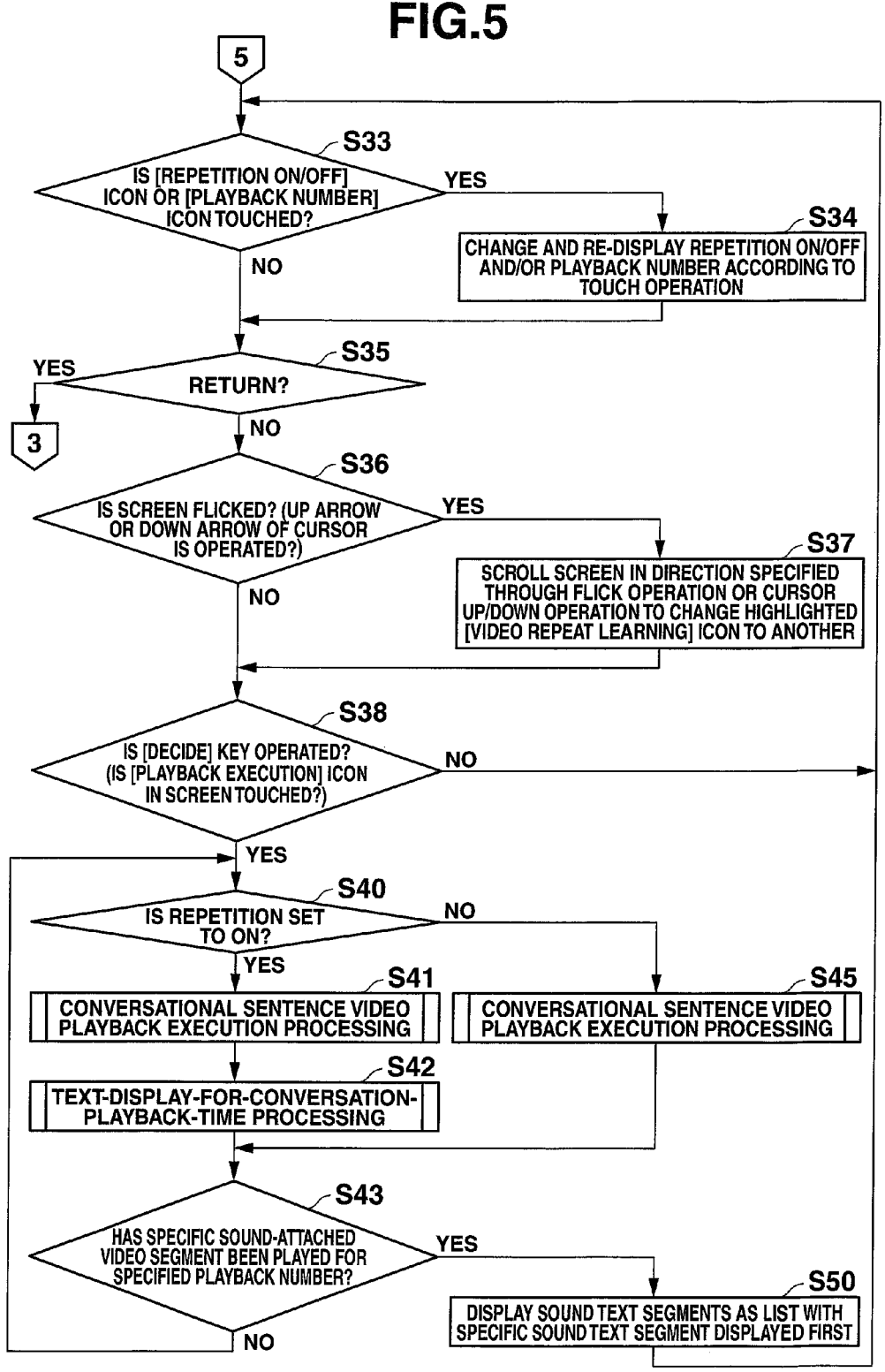
FIG. 5 is a flowchart of the sound learning processing.

FIGS. 3 to 5 are flowcharts of the sound learning processing performed by the CPU 20 reading the video playback program 81.

As shown in FIG. 3, in the sound learning processing, first, the CPU 20 displays titles of sound-attached videos 91 included in the sound teaching material content set 83 on the main display 10 in a list form and specifies a title (i.e. a sound-attached video 91) in the list of the titles of the sound-attached videos 91 on the basis of a user operation (Step S1).

Next, the CPU 20 moves to a normal playback mode for sound-attached videos and reads the sound-attached video 91, the title of which is specified (hereinafter a specific sound-attached video 91S), from the storage unit 80 to make the display unit 40 and the sound output unit 70 play the specific sound-attached video 91S (Step S2). At the time, the CPU 20 forms an information display area E1 at the edge part on the right on the main display 10 and forms an icon display area E2 at the edge part on the left on the main display 10 (see FIG. 8A).

Next, the CPU 20 displays a display item Ha (see FIG. 8A) about a state of video playback in the information display area E1 (Step S3). The display item Ha about the state of video playback includes: time (hereinafter an elapsed playback time) having elapsed since start of playback of the specific sound-attached video 91S, namely, time having been required to play the specific sound-attached video 91S from the beginning to a point currently being played; time (hereinafter a required playback time) required to play the whole specific sound-attached video 91S; and a volume level.

Next, the CPU 11 displays an explanation Hb (see FIG. 8A) about operations specific to the normal playback mode in the information display area E1 (Step S4). The explanation Hb about the operations specific to the normal playback mode includes an explanation that an operation on the right arrow of the cursor key 2*e* corresponds to an operation for a fast-forwarding command and an explanation that an operation on the left arrow of the cursor key 2*e* corresponds to an operation for a rewinding command.

Next, the CPU 20 displays an explanation Hc (see FIG. 8A) about operations during video playback in the information display area E1 (Step S5). The explanation Hc about the operations during video playback includes an explanation that an operation on the return key 2*g* corresponds to an operation for a pause command.

Next, the CPU 20 determines whether or not a pause command is made through an operation on the return key 2*g* (Step S6). When determining that a pause command is not made (Step S6; NO), the CPU 20 determines whether or not the specific sound-attached video 91S has been played to the end (Step S7).

When determining that the specific sound-attached video 91S has not been played to the end yet (Step S7; NO), the CPU 20 moves to Step S2. On the other hand, when determining that the specific sound-attached video 91S has been played to the end (Step S7; YES), the CPU 20 ends the sound learning processing.

When determining that a pause command is made through an operation on the return key 2*g* (Step S6; YES), the CPU 20 pauses the specific sound-attached video 91S to stop the sound with an image (still image) of the paused point displayed on the main display 10 (Step S11). At the time, in the information display area E1 of the main display 10, the display item Ha about the state of video playback (the elapsed playback time, the required playback time, the volume level and the like), the explanation Hb about the operations specific to the normal playback mode (the explanation that an operation on the right arrow of the cursor key 2*e* corresponds to an operation for a fast-forwarding command and the like) and the explanation Hc about the operations during video playback (the explanation that an operation on the return key 2*g* corresponds to an operation for a pause command and the like) are still displayed.

Next, the CPU 20 deletes (hides) the explanation Hc about the operations during video playback, which is displayed in the information display area E1, therefrom and displays an explanation Hd (see FIG. 8B) about operations during pause therein instead (Step S12). The explanation Hd about the operations during pause includes an explanation that an operation on the decision key 2*b* corresponds to an operation for a playback restart command.

Next, the CPU 20 temporarily stores information (for example, the elapsed playback time) about the paused point of the specific sound-attached video 91S in the storage unit 80 (Step S13) and then displays a playback execution icon Ia and a text display icon Ib in the icon display area E2 (Step S14, see FIG. 8B).

The playback execution icon Ia is an icon which is operated to restart playing the specific sound-attached video 91S. In the embodiment, as indicated by the explanation Hd about the operations during pause, the specific sound-attached video 91S restarts through not only a touch operation on the playback execution icon Ia but also an operation on the decision key 2*b*.

The text display icon Ib is an icon which is operated to display a sound text segment (s) 920 for a sound-attached video segment(s) 910.

Next, the CPU 20 determines whether or not a touch operation on the playback execution icon Ia or an operation on the decision key 2*b* is performed (Step S15). When determining that either of them is performed (Step S15; YES), the CPU 20 restarts the specific sound-attached video 91S from the paused point, at which the specific sound-attached video 91S is paused at Step S11, and then moves to Step S2.

On the other hand, when determining that neither of them is performed (Step S15; NO), the CPU 20 determines whether or not a touch operation on the text display icon Ib is performed (Step S17).

When determining that a touch operation on the text display icon Ib is not performed (Step S17; NO), the CPU 20 moves to Step S15.

On the other hand, when determining that a touch operation on the text display icon Ib is performed (Step S17; YES), as shown in FIG. 4, the CPU 20 sets a sound text segment 920 for a sound-attached video segment 910 including the paused point as a target for first display (Step S20).

Next, the CPU 20 deletes, among the displayed contents on the main display 10, the displayed contents (the video (still image) and the information display area E1 or a list of sound text segments 920) except for the icon display area E2 from the main display 10 to move to a sound text display mode and reads the sound text segments 920 from the storage unit 80 and then displays the sound text segments 920 for the respective sound-attached video segments 910 on the main display 10 in a list form in order, namely, in order of the sound-attached video segments 910 being played, with the sound text segment 920 as the target for first display displayed first (Step S21, see FIG. 8C). When the information display area E1 is deleted from the main display 10, the display item Ha about the state of video playback, the explanation Hb about the operations specific to the normal playback mode and the explanation Hd about the operations during pause are deleted from the main display 10 accordingly.

Next, the CPU 20 once deletes the icons (the text display icon Ib and the like), which are displayed in the icon display area E2, therefrom and displays the playback execution icon Ia and a video repeat learning icon Ic therein instead (Step S22, see FIG. 8C). At the time, the CPU 20 also displays the video repeat learning icons Ic at the beginnings of the sound text segments 920, which are displayed on the main display 10 in a list form. The video repeat learning icons Ic are each an icon which is operated to move the action mode of the electronic dictionary 1 to the above-described video repeat learning mode (the mode in which a predetermined sound-attached video segment 910 is played one or multiple times) or the like.

Next, the CPU 20 determines whether or not a touch operation on the playback execution icon Ia or an operation on the decision key 2b is performed (Step S23). When determining that either of them is performed (Step S23; YES), the CPU 20 deletes the sound text segments 920, which are displayed on the main display 10, from the main display 10 and restarts the specific sound-attached video 91S from the paused point (Step S24), at which the specific sound-attached video 91S is paused at Step S11, and then moves to Step S2 to move to the normal playback mode. Consequently, the sound text segments 920 are prevented from being displayed during video playback.

On the other hand, when determining that neither of them is performed (Step S23; NO), the CPU 20 determines whether or not an up/down flick operation on the list of the sound, text segments 920 displayed on the main display 10 or an operation on the up arrow or the down arrow of the cursor key 2e is performed (Step S25).

When determining that either of them is performed (Step S25; YES), the CPU 20 scrolls the list of the sound text segments 920 displayed on the main display 10 in a direction specified through the operation (Step S26, see FIG. 8D) and then moves to Step S23.

On the other hand, when determining that neither of them is performed (Step S25; NO), the CPU 20 determines whether or not a touch operation on any of the video repeat learning icons Ic is performed (Step S30).

When determining that a touch operation on any of the video repeat learning icons Ic is not performed (Step S30; NO), the CPU 20 moves to Step S23.

On the other hand, when determining that a touch operation on any of the video repeat learning icons Ic is performed (Step S30; YES), the CPU 20 deletes the icons (the video repeat learning icon Ic and the playback execution icon Ia), which are displayed in the icon display area E2, therefrom to move to the video repeat learning mode. Then, the CPU 20 displays and highlights a specific conversational sentence video playback execution icon Id in the icon display area E2, reads the set contents for the video repeat learning mode from the set-content-for-video-repeat-learning storage table 84 and then displays the set content of the with-or-without repetition with a repetition ON/OFF icon Ie and the set content of the playback number with a playback number icon If in the icon display area E2 (Step S31, see FIG. 9A). At the time, the CPU 20 displays an explanation window W1 for explaining functions of these icons (the specific conversational sentence video playback execution icon Id, the repetition ON/OFF icon Ie and the playback number icon If) at the bottom on the main display 10.

The specific conversational sentence video playback execution icon Id is an icon which is operated to play one or multiple times a sound-attached video segment 910 (hereinafter a specific sound-attached video segment 910S) for a sound text segment 920 (hereinafter a specific sound text segment 920S) specified in the list of the sound text segments 920 through a user operation. In the embodiment, the specific sound-attached video segment 910S is played one or multiple times through not only a touch operation on the specific conversational sentence video playback execution icon Id but also an operation on the decision key 2b.

The repetition ON/OFF icon Ie is an icon which is operated to switch with-repetition and without-repetition (namely, to determine whether or not to provide the silent time with the specific sound text segment 920S displayed for a user to do repetition after each time the specific sound-attached video segment 910S is played). In the embodiment, the repetition ON/OFF icon Ie is highlighted when the set content of the with-or-without repetition is "YES", and the repetition ON/OFF icon Ie is displayed as usual (not highlighted) when the set content of the with-or-without repetition is "NO".

The playback number icon If is an icon which is operated to change the playback number. In the embodiment, each time the playback number icon If is operated, the playback number changes from one to three, five, one, three and so on in the order named.

Next, the CPU 20 specifies, in the list of the sound text segments 920 displayed on the main display 10, a sound text segment 920 displayed first (on the top of the list) on the main display 10 as the specific sound text segment 920S and highlights the video repeat learning icon Ic displayed at the beginning of the specific sound text segment 920S (Step S32).

Next, as shown in FIG. 5, the CPU 20 determines whether or not a touch operation on the repetition ON/OFF icon Ie or a touch operation on the playback number icon If is performed (Step S33). When determining that neither of them is performed (Step S33; NO), the CPU 20 moves to Step S35.

On the other hand, when determining that at least one of them is performed (Step S33; YES), the CPU 20 changes the set content(s) for the video repeat learning mode in response to the touch operation(s) and updates the contents stored in the set-content-for-video-repeat-learning storage table 84 and the contents displayed on the main display 10 with respect to the repetition ON/OFF icon Ie and/or the playback number icon If (Step S34). Thus, the playback number is changed and specified on the basis of a user operation. Also, the with-repetition and the without-repetition, namely, permission and forbiddance of processing at Step S42 described below, are switched (i.e. whether or not to provide the silent time with the specific sound text segment 920S displayed for a user to do repetition after each time the specific sound-attached video segment 910S is played is determined) on the basis of a user operation.

Next, the CPU 20 determines whether or not an operation on the return key 2g is performed (Step S35). When determining that an operation on the return key 2g is performed (Step S35; YES), the CPU 20 deletes the explanation window W1, which is displayed on the main display 10, from the main display 10 and then, as shown in FIG. 4, moves to Step S22 to move to the sound text display mode.

On the other hand, as shown in FIG. 5, when determining that an operation on the return key 2g is not performed (Step S35; NO), the CPU 20 determines whether or not an up/down flick operation on the list of the sound text segments 920 displayed on the main display 10 or an operation on the up arrow or the down arrow of the cursor key 2e is performed (Step S36).

When determining that neither of them is performed (Step S36; NO), the CPU 20 moves to Step S38.

On the other hand, when determining that either of them is performed (Step S36; YES), the CPU 20 scrolls the list of the sound text segments 920 displayed on the main display 10 in a direction specified through the operation to newly specify another sound text segment 920 as the specific sound text segment 920S and highlights a video repeat learning icon Ic which is for the new specific sound text segment 920S instead of the video repeat learning icon Ic highlighted so far (Step S37).

Next, the CPU 20 determines whether or not a touch operation on the specific conversational sentence video playback execution icon Id, a touch operation on any of the video repeat learning icons Ic or an operation on the decision key 2b is performed (Step S38). When determining that none of them is performed (Step S38; NO), the CPU 20 moves to Step S33.

On the other hand, when determining that any of them is performed (Step S38; YES), the CPU 20 determines whether or not the set content of the with-or-without repetition is ON (Step S40). At Step S38, when the user touches the video repeat learning icon Ic displayed at the beginning of a sound text segment 920, the sound text segment 920 is specified as the specific sound text segment 920S.

When determining that the set content of the with-or-without repetition is ON (Step S40; YES), the CPU 20 performs conversational sentence video playback execution processing (Step S41).

Figure 6:
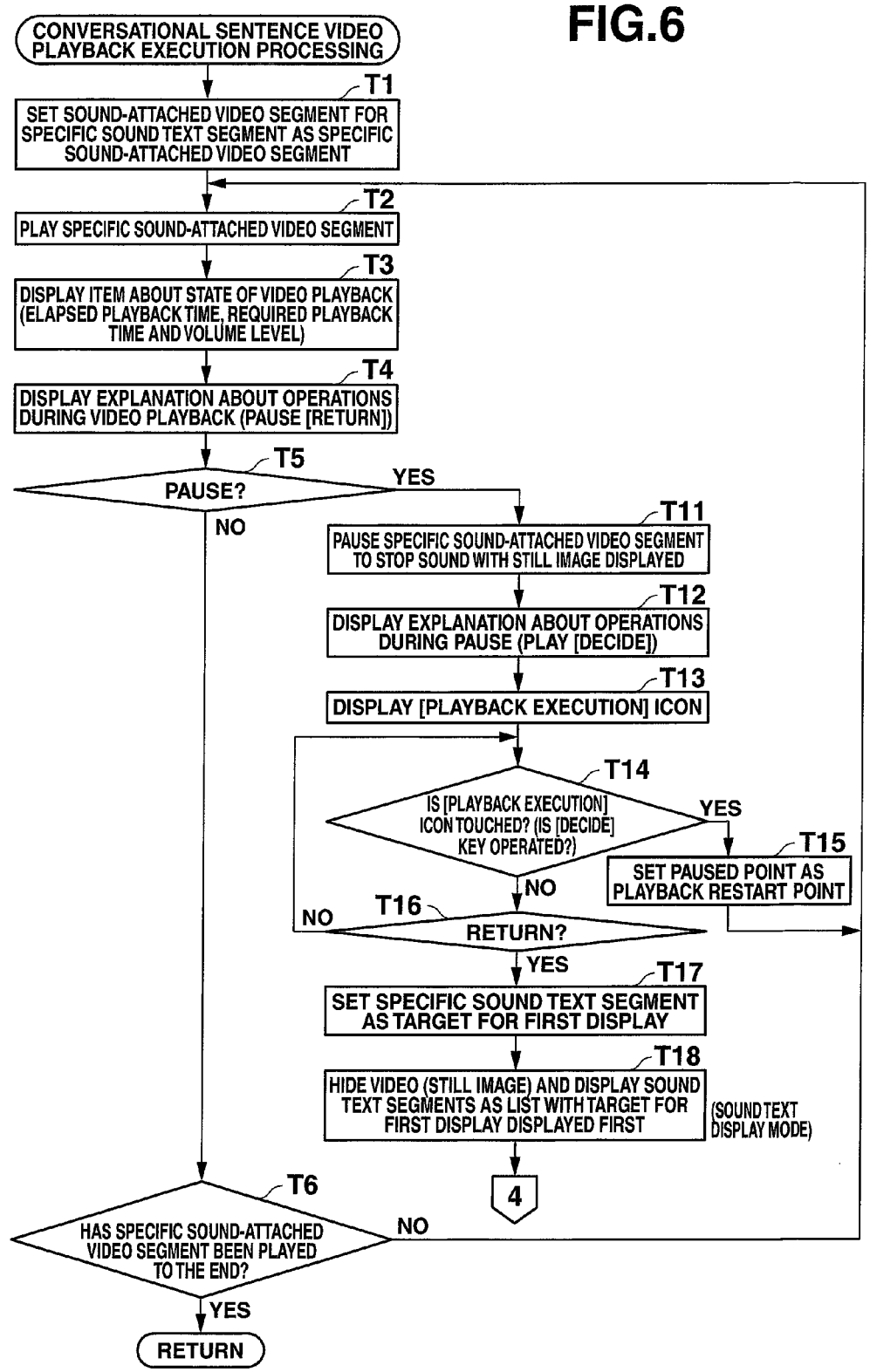
FIG. 6 is a flowchart of conversational sentence video playback execution processing in the sound learning processing.

More specifically, as shown in FIG. 6, in the conversational sentence video playback execution processing, first, the CPU 20 specifies a sound-attached video segment 910 for the specific sound text segment 920S and sets the sound-attached video segment 910 as the specific sound-attached video segment 910S (Step T1). At the time, the CPU 20 deletes the explanation window W1 and the list of the sound text segments 920, which are displayed on the main display 10, from the main display 10. Consequently, the sound text segments 920 are prevented from being displayed during video playback at Step T2. Further, the CPU 20 forms the information display area E1 at the edge part on the right on the main display 10 and deletes the icons (the specific conversational sentence video playback execution icon Id, the repetition ON/OFF icon Ie and the playback number icon If), which are displayed in the icon display area E2, therefrom.

Next, the CPU 20 plays the specific sound-attached video segment 910S (Step T2) and displays the display item Ha about the state of video playback (the elapsed playback time, the required playback time, the volume level and the like) in the information display area E1 (Step T3).

Next, the CPU 20 displays the explanation Hc about the operations during video playback (the explanation that an operation on the return key 2g corresponds to an operation for a pause command and the like) in the information display area E1 (Step T4). In the video repeat learning mode, the explanation Hb about the operations specific to the normal playback mode (the explanation that an operation on the right arrow of the cursor key 2e corresponds to an operation for a fast-forwarding command and the like) is not displayed in the information display area E1, which is different from the normal playback mode. Consequently, the explanation Hb about the operations specific to the normal playback mode functions as a mark to recognize which is played, a sound-attached video 91 or a sound-attached video segment 910.

Next, the CPU 20 determines whether or not a pause command is made through an operation on the return key 2g (Step T5). When determining that a pause command is made (Step T5; YES), the CPU 20 pauses the specific sound-attached video segment 910S to stop the sound with the image (still image) of the paused point displayed on the main display 10 (Step T11). At the time, in the information display area E1 of the main display 10, the display item Ha about the state of video playback (the elapsed playback time, the required playback time, the volume level and the like) and the explanation Hc about the operations during video playback (the explanation that an operation on the return key 2g corresponds to an operation for a pause command and the like) are still displayed.

Next, the CPU 20 deletes the explanation Hc about the operations during video playback (the explanation that an operation on the return key 2g corresponds to an operation for a pause command and the like), which is displayed in the information display area E1, therefrom and displays the explanation Hd about the operations during pause (the explanation that an operation on the decision key 2b corresponds to an operation for a playback restart command) therein instead (Step T12).

Next, the CPU 20 displays the playback execution icon Ia in the icon display area E2 (Step T13). In the video repeat learning mode, the text display icon Ib is not displayed in the ion display area E2 during pause, which is different from the normal playback mode. Consequently, the text display icon Ib functions as a mark to recognize which is paused, a sound-attached video 91 or a sound-attached video segment 910.

Next, the CPU 20 determines whether or not a touch operation on the playback execution icon Ia or an operation on the decision key 2b is performed (Step T14). When determining that either of them is performed (Step T14; YES), the CPU 20 sets the paused point, at which the specific sound-attached video segment 910S is paused at Step T5, as a playback restart point of the specific sound-attached video segment 910S in the conversational sentence video playback execution processing (Step T15) and then moves to Step T2.

On the other hand, when determining that neither of them is performed (Step T14; NO), the CPU 20 determines whether or not an operation on the return key 2g is performed (Step T16).

When determining that an operation on the return key 2g is not performed (Step T16; NO), the CPU 20 moves to Step T14.

On the other hand, when determining that an operation on the return key 2g is performed (Step T16; YES), the CPU 20 sets the specific sound text segment 920S as a target for first display (Step T17).

Next, the CPU 20 deletes the video (still image), which is displayed on the main display 10, from the main display 10 to move to the sound text display mode, reads the sound text segments 920 from the storage unit 80 and displays the sound text segments 920 for the respective sound-attached video segments 910 on the main display 10 in a list form in order with the sound text segment 920 as the target for first display displayed first (Step T18) and then ends the conversational sentence video playback execution processing and moves to Step S31 (see FIG. 4). At the time, the CPU 20 deletes the information display area E1, which is formed on the main display 10, from the main display 10. Accordingly, the display item Ha about the state of video playback and the explanation Hd about the operations during pause are deleted from the main display 10. Further, the CPU 20 deletes the playback execution icon Ia, which is displayed in the icon display area E2, therefrom.

When determining that a pause command is not made (Step T5; NO), the CPU 20 determines whether or not the specific sound-attached video segment 910S has been played to the end (Step T6).

When determining that the specific sound-attached video segment 910S has not been played to the end yet (Step T6; NO), the CPU 20 moves to Step T2. On the other hand, when determining that the specific sound-attached video segment 910S has been played to the end (Step T6; YES), the CPU 20 ends the conversational sentence video playback execution processing.

When ending the conversational sentence video playback execution processing (Step S41), as shown in FIG. 5, the CPU performs text-display-for-conversation-playback-time processing (Step S42).

Figure 7:
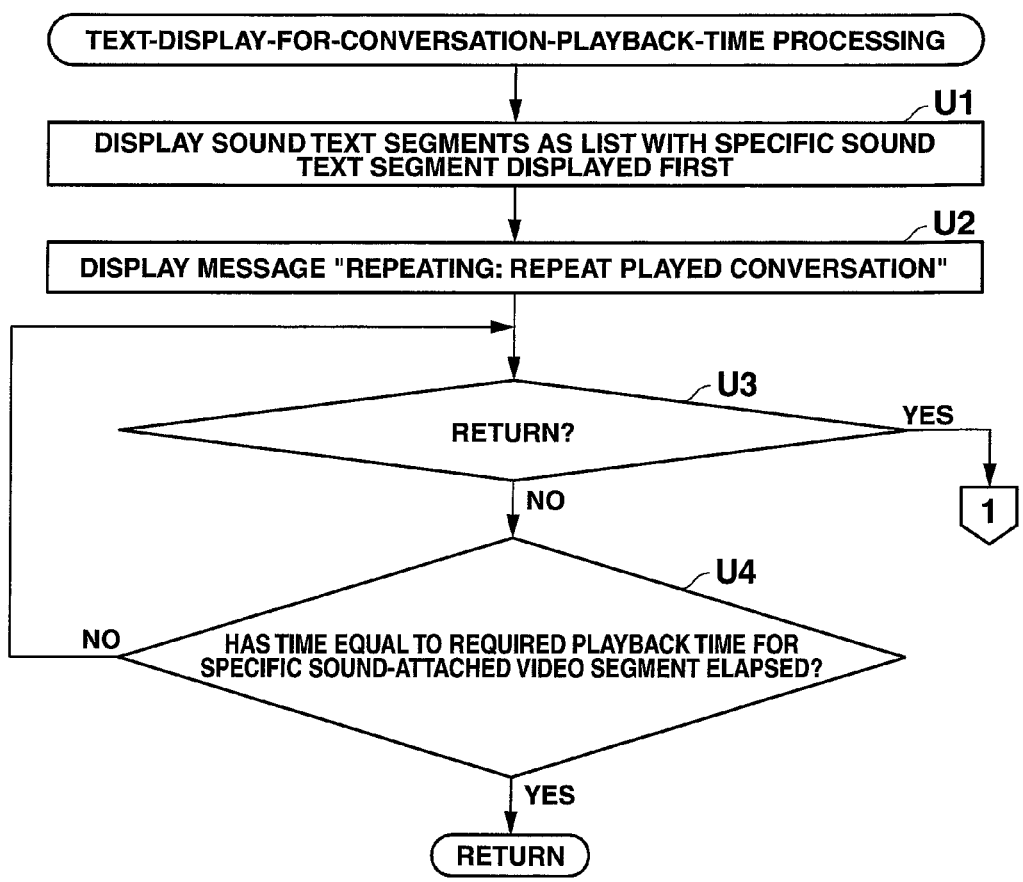
FIG. 7 is a flowchart of text-display-for-conversation-playback-time processing in the sound learning processing.

More specifically, as shown in FIG. 7, in the text-display-for-conversation-playback-time processing, first, the CPU 20 deletes the video (still image), which is displayed on the main display 10, from the main display 10, reads the sound text segments 920 from the storage unit 80 and displays the sound text segments 920 for the respective sound-attached video segments 910 on the main display 10 in a list form in order with the specific sound text segment 920S displayed first (Step U1). Consequently, each time the specific sound-attached video segment 910S is played by the conversational sentence video playback execution processing, the sound text segments 920 are displayed on the main display 10 in a list form. At the time, the CPU 20 deletes the information display area E1, which is formed on the main display 10, from the main display 10. Accordingly, the display item Ha about the state of video playback and the explanation Hd about the operations during pause are deleted from the main display 10. Further, the CPU 20 displays and highlights the specific conversational sentence video playback execution icon Id in the icon display area E2 and displays the repetition ON/OFF icon Ie and the playback number icon If therein. Further, the CPU 20 displays the explanation window W1 for explaining the functions of these icons (the specific conversational sentence video playback execution icon Id, the repetition ON/OFF icon Ie and the playback number icon If) at the bottom on the main display 10.

Next, the CPU 20 displays a message to urge a user to repeat the specific sound text segment 920S, for example, a message window W2 for a message "Repeating: Repeat the played conversation." (see FIG. 12C), on the main display 10 (Step U2). Following the message, the user reads aloud or silently the specific sound text segment 920S, thereby repeating the sound content of the specific sound-attached video segment 910S.

Next, the CPU 20 determines whether or not an operation on the return key 2g is performed (Step U3). When determining that an operation on the return key 2g is performed (Step U3; YES), the CPU 20 ends the text-display-for-conversation-playback-time processing and moves to Step S20 to move to the normal playback mode (see FIG. 4).

On the other hand, when determining that an operation on the return key 2g is not performed (Step U3; NO), the CPU 20 determines whether or not a time (time length) equal to a required playback time for the specific sound-attached video segment 910S has elapsed (Step U4). At Step U4, the CPU 20 may determine whether or not a time length corresponding to the required playback time (for example, a time length increased or decreased by predetermined seconds from the required playback time) for the specific sound-attached video segment 910S has elapsed, or may determine whether or not a time length corresponding to the length (the number of letters/words) of the specific sound text segment 920S has elapsed.

When determining that a time equal to the required playback time for the specific sound-attached video segment 910S has not elapsed yet (Step U4; NO), the CPU 20 moves to Step U3. On the other hand, when determining that a time equal to the required playback time for the specific sound-attached video segment 910S has elapsed (Step U4; YES), the CPU 20 deletes the message window W2, which is displayed on the main display 10, from the main display 10 and ends the text-display-for-conversation-playback-time processing.

When ending the text-display-for-conversation-playback-time processing, as shown in FIG. 5, the CPU 20 determines whether or not the specific sound-attached video segment 910S has been played for the playback number stored in the set-content-for-video-repeat-learning storage table 84 (Step S43).

When determining that the specific sound-attached video segment 910S has not been played for the playback number stored in the set-content-for-video-repeat-learning storage table 84 yet (Step S43; NO), the CPU 20 moves to Step S40. Consequently, the specific sound-attached video segment 910S is played for the playback number specified with the playback number icon If.

On the other hand, when determining that the specific sound-attached video segment 910S has been played for the playback number stored in the set-content-for-video-repeat-learning storage table 84 (Step S43; YES), the CPU 20 displays the sound text segments 920 for the respective sound-attached video segments 910 on the main display 10 in a list form in order with the specific sound text segment 920S displayed first (Step S50) and then moves to Step S33. Consequently, after the specific sound-attached video segment 910S is played for the playback number specified with the playback number icon If, the sound text segments 920 are displayed on the main display 10 in a list form. In the case in which Step S24 (see FIG. 4) is taken after Step S41 or S45 via Steps S33 to S35, the specific sound-attached video 91S restarts from the paused point, at which the sound-attached video 91S is paused at Step S11, after the specific sound-attached video segment 910S is played for the playback number.

When determining that the set content of the with-or-without repetition is not ON (Step S40; NO), the CPU 20 performs conversational sentence video playback execution processing which is the same as that performed at Step S41 (Step S45) and then moves to Step S43. In this case, at Step S50 after Step S43, the CPU 20 deletes the video (still image), which is displayed on the main display 10, from the main display 10 and displays the sound text segments 920 thereon in a list form. At the time, the CPU 20 deletes the information display area E1, which is formed on the main display 10, from the main display 10. Accordingly, the display item Ha about the state of video playback and the explanation Hd about the operations during pause are deleted from the main display 10. Further, the CPU 20 displays and highlights the specific conversational sentence video playback execution icon Id in the icon display area E2 and displays the repetition ON/OFF icon Ie and the playback number icon If therein. Further, the CPU 20 displays the explanation window W1 for explaining the functions of these icons (the specific conversational sentence video playback execution icon Id, the repetition ON/OFF icon Ie and the playback number icon If) at the bottom on the main display 10.

ACTION EXAMPLES

Next, the sound learning processing is described in detail with reference to FIGS. 8A to 12D. In FIGS. 8A to 12D, a display screen of the main display 10 is shown on the right, and an operation content is shown on the left.

First Action Example

First, when a user specifies the title of a sound-attached video 91, "リトル・○○○ NY 編 1. 空港の迷子犬 (Little ○○○ in N.Y., Chapter 1. Stray Dog at Airport)", in the list of titles of sound-attached videos 91 which are included in the sound teaching material content set 83 and displayed on the main display 10 (Step S1), the electronic dictionary 1 moves to the normal playback mode for sound-attached videos, and as shown in FIG. 8A, this specific sound-attached video 91S is read from the storage unit 80 and played (Step S2). At the time, the information display area E1 is formed at the edge part on the right on the main display 10, and the icon display area E2 is formed at the edge part on the left thereon. In this first action example and the below-described second action example, the sounds included in the specific sound-attached video 91S are English and Japanese subtitles are inserted into frame images of the specific sound-attached video 91S, but these subtitles are not the text (text segments) in the present invention.

Next, the display item Ha about the state of video playback (the elapsed playback time, the required playback time, the volume level and the like), the explanation Hb about the operations specific to the normal playback mode (the explanation that an operation on the right arrow of the cursor key 2e corresponds to an operation for a fast-forwarding command and the like) and the explanation Hc about the operations during video playback (the explanation that an operation on the return key 2g corresponds to an operation for a pause command and the like) are displayed in the information display area E1 (Steps S3 to S5).

Next, as shown in FIG. 8B, when the user operates the return key 2g to make a pause command (Step S6; YES), the specific sound-attached video 91S is paused, and the sound stops with the image (still image) of the paused point displayed on the main display 10 (Step S11). At the time, in the information display area E1 of the main display 10, the display item Ha about the state of video playback, the explanation Hb about the operations specific to the normal playback mode and the explanation Hc about the operations during video playback are still displayed.

Next, the explanation Hc about the operations during video playback, which is displayed in the information display area E1, is deleted therefrom, and the explanation Hd about the operations during pause (the explanation that an operation on the decision key 2b corresponds to an operation for a playback restart command and the like) is displayed therein instead (Step S12). Consequently, in the information display area E1 of the main display 10, the display item Ha about the state of video playback, the explanation Hb about the operations specific to the normal playback mode and the explanation Hd about the operations during pause are displayed.

Next, the playback execution icon Ia and the text display icon Ib are displayed in the icon display area E2 (Step S14).

When the user touches the playback execution icon Ia (Step S15; YES), the specific sound-attached video 91S restarts from the paused point (Step S16).

On the other hand, as shown in FIG. 8C, when the user does not touch the playback execution icon Ia (Step S15; NO) but touches the text display icon Ib (Step S17; YES), a sound text segment 920 "What's taking my girl so long to come out?" for a sound-attached video segment 910 including the paused point is set as a target for first display (Step S20), and then the electronic dictionary 1 moves to the sound text display mode, so that the video (still image), which is displayed on the main display 10, is deleted from the main display 10, and the sound text segments 920 for the respective sound-attached video segments 910 are displayed on the main display 10 in a list form in order with the sound text segment 920 as the target for first display, "What's taking my girl so long to come out?", displayed first (Step S21). At the time, the information display area E1, which is displayed on the main display 10, is deleted from the main display 10, and accordingly, the display item Ha about the state of video playback, the explanation Hb about the operations specific to the normal playback mode and the explanation Hd about the operations during pause are deleted from the main display 10. In this first action example and the below-described second action example 2, the sound text segments 920 include, in addition to the texts in the language (English) of the sounds of the sound-attached video 91, texts translated from the texts in the language (English) of the sounds thereof to Japanese.

Next, the icons (in this action example, the playback execution icon Ia and the text display icon Ib), which are displayed in the icon display area E2, are once deleted therefrom, and the playback execution icon Ia and the video repeat learning icon Ic are displayed therein instead (Step S22). At the time, the video repeat learning icons Ic are displayed at the beginnings of the sound text segments 920, which are displayed on the main display 10 in a list form, too.

Next, as shown in FIG. 8D, when the user operates the up arrow or the down arrow of the cursor key 2e (Step S25; YES), the list of the sound text segments 920 displayed on the main display 10 is scrolled in a direction specified with the operation (Step S26).

Next, as shown in FIG. 9A, when the user touches the video repeat learning icon Ic in the icon display area E2 (Step S30; YES), the icons (the video repeat learning icon Ic and the playback execution icon Ia), which are displayed in the icon display area E2, are deleted therefrom so that the electronic dictionary 1 moves to the video repeat learning mode, and the specific conversational sentence video playback execution icon Id is displayed and highlighted in the icon display area E2, and also the repetition ON/OFF icon Ie and the playback number icon If are displayed therein (Step S31). In this action example, the with-or-without repetition is set to "NO" (OFF), and the playback number is set to "1".

At the time, the explanation window W1 for explaining the functions of these icons (the specific conversational sentence video playback execution icon Id, the repetition ON/OFF icon Ie and the playback number icon If) is displayed at the bottom on the main display 10, too.

Next, in the list of the sound text segments 920 displayed on the main display 10, a sound text segment 920 displayed first (on the top of the list) on the main display 10, "This is JFK Airport in New York.", is specified as the specific sound text segment 920S, and the video repeat learning icon Ic displayed at the beginning of the specific sound text segment 920S is highlighted (Step S32).

Next, as shown in FIG. 9B, when the user operates the decision key 2b (Step S38; YES), it is determined that the with-or-without repetition is not set to ON (Step S40; NO), and a sound-attached video segment 910 for the specific sound text segment 920S "This is JFK Airport in New York." is set as the specific sound-attached video segment 910S (Step T1). At the time, the list of the sound text segments 920, which are displayed on the main display 10, is deleted from the main display 10, the information display area E1 is formed at the edge part on the right on the main display 10, and the icons (the specific conversational sentence video playback execution icon Id, the repetition ON/OFF icon Ie and the playback number icon If), which are displayed in the icon display area E2, are deleted therefrom.

Next, the specific sound-attached video segment 910S is played (Step T2), and the display item Ha about the state of video playback and the explanation Hc about the operations during video playback are displayed in the information display area E1 (Steps T3 and T4). At the time, the explanation Hb about the operations specific to the normal playback mode (the explanation that an operation on the right arrow of the cursor key 2e corresponds to an operation for a fast-forwarding command and the like) is not displayed in the information display area E1.

Next, as shown in FIG. 9C, when the user operates the return key 2g to make a pause command (Step T5; YES), the specific sound-attached video segment 910S is paused, and the sound stops with the image (still image) of the paused point displayed on the main display 10 (Step T11). At the time, in the information display area E1 of the main display 10, the display item Ha about the state of video playback and the explanation Hc about the operations during video playback are still displayed.

Next, the explanation Hc about the operations during video playback, which is displayed in the information display area E1, is deleted therefrom, and the explanation Hd about the operations during pause is displayed therein instead (Step T12). Further, the playback execution icon Ia is displayed in the icon display area E2 (Step T13). At the time, the text display icon Ib is not displayed in the icon display area E2.

Next, as shown in FIG. 9D, when the user operates the return key 2g (Step T16; YES), the specific sound text segment 920S "This is JFK Airport in New York." is set as a target for first display (Step T17).

Next, the video (still image), which is displayed on the main display 10, is deleted from the main display 10 so that the electronic dictionary 1 moves to the sound text display mode, and the sound text segments 920 for the respective sound-attached video segments 910 are displayed on the main display 10 in a list form in order with the sound text segment 920 as the target for first display, "This is JFK Airport in New York.", displayed first (Step T18). At the time, the information display area E1, which is formed on the main display 10, is deleted from the main display 10, and accordingly, the display item Ha about the state of video playback and the explanation Hd about the operations during pause are deleted from the main display 10. Further, the playback execution icon Ia, which is displayed in the icon display area E2, is deleted therefrom.

Next, the playback execution icon Ia, which is displayed in the icon display area E2, is deleted therefrom so that the electronic dictionary 1 moves to the video repeat learning mode, and the specific conversational sentence video playback execution icon Id is displayed and highlighted in the icon display area E2, and also the repetition ON/OFF icon Ie and the playback number icon If are displayed therein (Step S31). At the time, the explanation window W1 for explaining the functions of these icons (the specific conversational sentence video playback execution icon Id, the repetition ON/OFF icon Ie and the playback number icon If) is displayed at the bottom on the main display 10, too.

Next, in the list of the sound text segments 920 displayed on the main display 10, the sound text segment 920 displayed first (on the top of the list) on the main display 10, "This is JFK Airport in New York.", is specified as the specific sound text segment 920S, and the video repeat learning icon Ic displayed at the beginning of the specific sound text segment 920S is highlighted (Step S32).

Figure 10A:
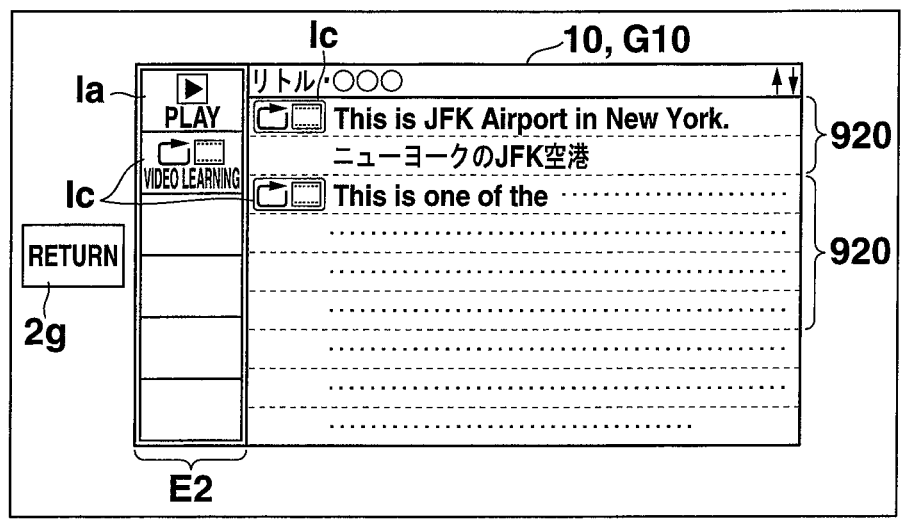
FIGS. 10A and 10B show contents displayed on the display unit.

Next, as shown in FIG. 10A, when the user operates the return key 2g (Step S35; YES), the electronic dictionary 1 moves to the sound text display mode, and the icons (in this action example, the specific conversational sentence video playback execution icon Id, the repetition ON/OFF icon Ie and the playback number icon If), which are displayed in the icon display area E2, are deleted therefrom, and the playback execution icon Ia and the video repeat learning icon Ic are displayed therein instead (Step S22). At the time, the video repeat learning icons Ic are displayed at the beginnings of the sound text segments 920, which are displayed on the main display 10 in a list form, too.

Figure 10B:
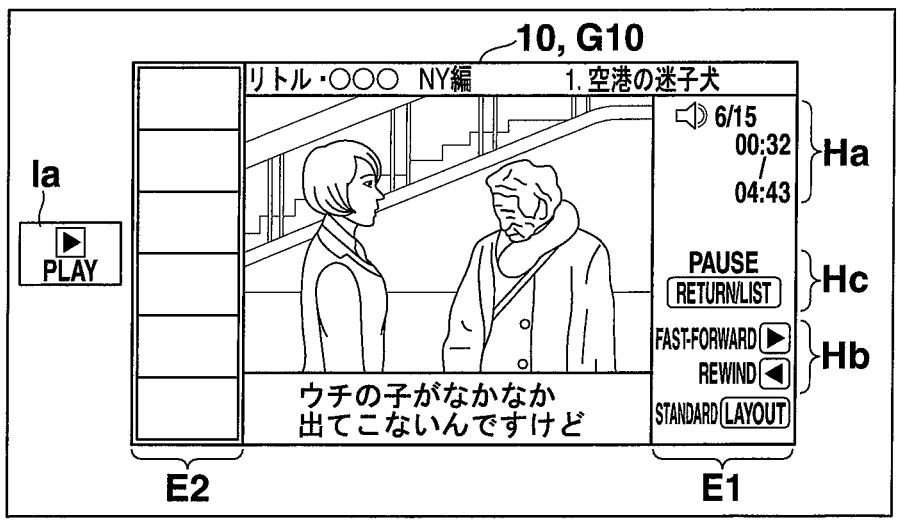

Next, as shown in FIG. 10B, when the user touches the playback execution icon Ia (Step S23; YES), the sound text segments 920, which are displayed on the main display 10, are deleted therefrom, and the specific sound-attached video 91S restarts from the paused point (see FIG. 8B) (Step S24), and then the electronic dictionary 1 moves to the normal playback mode.

Next, the information display area E1 is formed at the edge part on the right on the main display 10, the icon display area E2 is formed at the edge part on the left thereon, and the display item Ha about the state of video playback, the explanation Hb about the operations specific to the normal playback mode and the explanation Hc about the operations during video playback are displayed in the information display area E1 (Steps S3 to S5).

Second Action Example

Figure 11A:
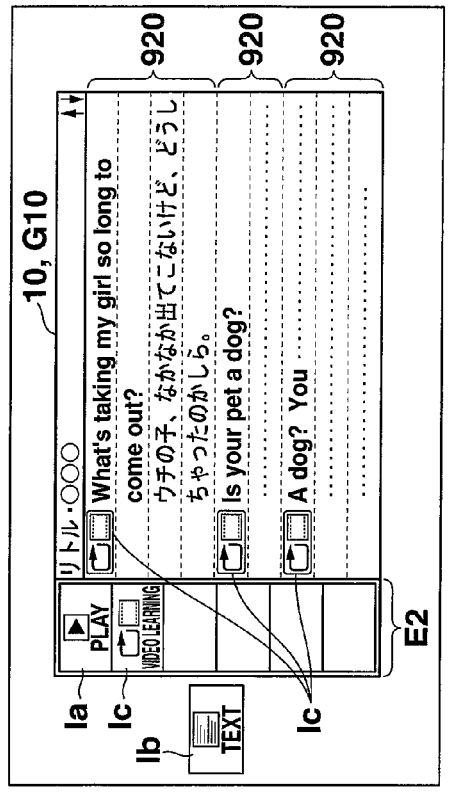
FIGS. 11A to 11D show contents displayed on the display unit.

First, when a user specifies the title of a sound-attached video 91, "リトル・○○○NY編 1. 空港の迷子 (Little ○○○ in N.Y., Chapter 1. Stray Dog at Airport)", in the list of titles of sound-attached videos 91 which are included in the sound teaching material content set 83 and displayed on the main display 10 (Step S1), the electronic dictionary 1 moves to the normal playback mode for sound-attached videos, and as shown in FIG. 11A, this specific sound-attached video 91S is read from the storage unit 80 and played (Step S2). At the time, the information display area E1 is formed at the edge part on the right on the main display 10, and the icon display area E2 is formed at the edge part on the left thereon.

Next, the display item Ha about the state of video playback (the elapsed playback time, the required playback time, the volume level and the like), the explanation Hb about the operations specific to the normal playback mode (the explanation that an operation on the right arrow of the cursor key 2e corresponds to an operation for a fast-forwarding command and the like) and the explanation Hc about the operations during video playback (the explanation that an operation on the return key 2g corresponds to an operation for a pause command and the like) are displayed in the information display area E1 (Steps S3 to S5).

Figure 11C:
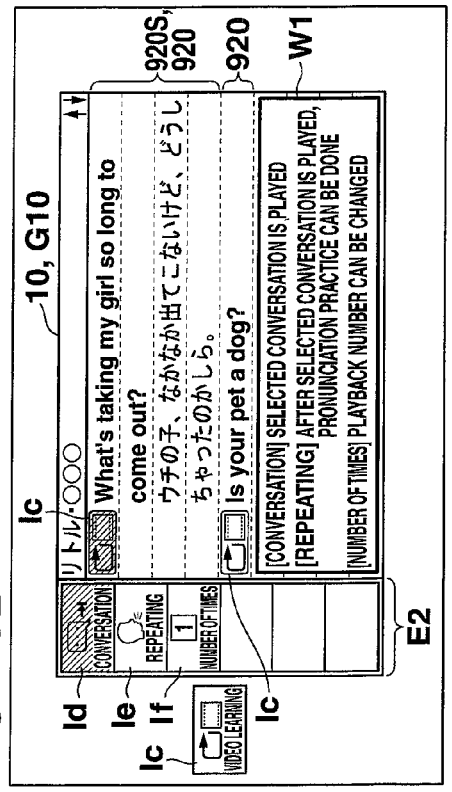
Figure 11B:
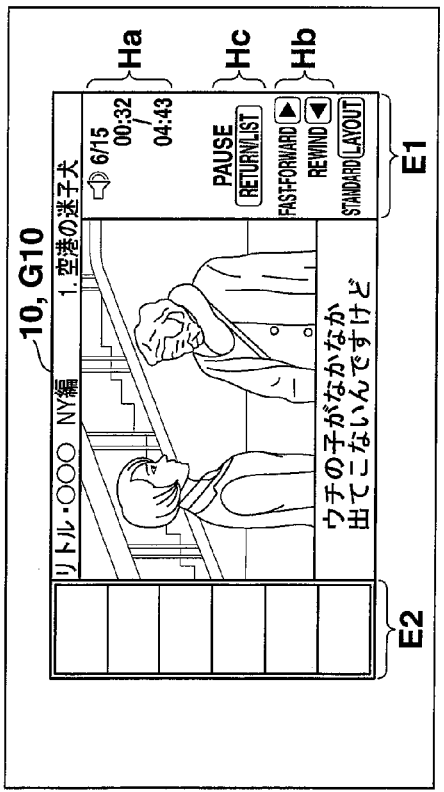

Next, as shown in FIG. 11B, when the user operates the return key 2g to make a pause command (Step S6; YES), the specific sound-attached video 91S is paused, and the sound stops with the image (still image) of the paused point displayed on the main display 10 (Step S11). At the time, in the information display area E1 of the main display 10, the display item Ha about the state of video playback, the explanation Hb about the operations specific to the normal playback mode and the explanation Hc about the operations during video playback are still displayed.

Next, the explanation Hc about the operations during video playback, which is displayed in the information display area E1, is deleted therefrom, and the explanation Hd about the operations during pause (the explanation that an operation on the decision key 2b corresponds to an operation for a playback restart command and the like) is displayed therein instead (Step S12). Consequently, in the information display area E1 of the main display 10, the display item Ha about the state of video playback, the explanation Hb about the operations specific to the normal playback mode and the explanation Hd about the operations during pause are displayed.

Next, the playback execution icon Ia and the text display icon Ib are displayed in the icon display area E2 (Step S14).

Next, as shown in FIG. 11C, when the user touches the text display icon Ib (Step S17; YES), a sound text segment 920 "What's taking my girl so long to come out?" for a sound-attached video segment 910 including the paused point is set as a target for first display (Step S20), and then the electronic dictionary 1 moves to the sound text display mode, so that the video (still image), which is displayed on the main display 10, is deleted from the main display 10, and the sound text segments 920 for the respective sound-attached video segments 910 are displayed on the main display 10 in a list form in order with the sound text segment 920 as the target for first display, "What's taking my girl so long to come out?", displayed first (Step S21). At the time, the information display area E1, which is displayed on the main display 10, is deleted from the main display 10, and accordingly, the display item Ha about the state of video playback, the explanation Hb about the operations specific to the normal playback mode and the explanation Hd about the operations during pause are deleted from the main display 10.

Next, the icons (in this action example, the playback execution icon Ia and the text display icon Ib), which are displayed in the icon display area E2, are once deleted therefrom, and the playback execution icon Ia and the video repeat learning icon Ic are displayed therein instead (Step S22). At the time, the video repeat learning icons Ic are displayed at the beginnings of the sound text segments 920, which are displayed on the main display 10 in a list form, too.

Figure 11D:
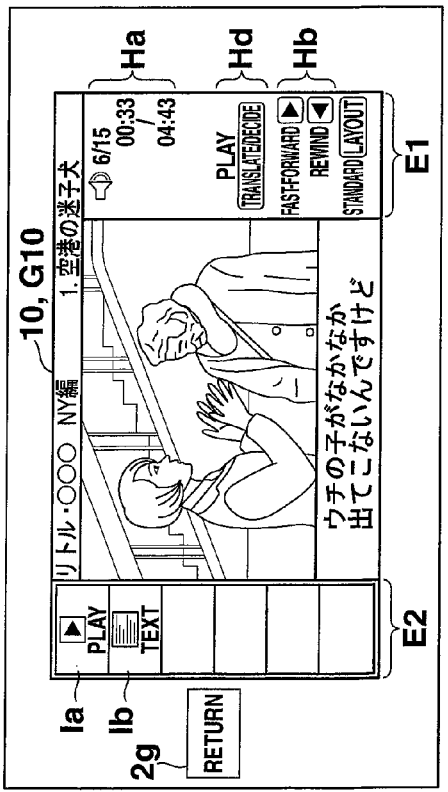

Next, as shown in FIG. 11D, when the user touches the video repeat learning icon Ic in the icon display area E2 (Step S30; YES), the icons (the video repeat learning icon Ic and the playback execution icon Ia), which are displayed in the icon display area E2, are deleted therefrom so that the electronic dictionary 1 moves to the video repeat learning mode, and the specific conversational sentence video playback execution icon Id is displayed and highlighted in the icon display area E2, and also the repetition ON/OFF icon Ie and the playback number icon If are displayed therein (Step S31). In this action example, the with-or-without repetition is set to "NO" (OFF), and the playback number is set to "1".

At the time, the explanation window W1 for explaining the functions of these icons (the specific conversational sentence video playback execution icon Id, the repetition ON/OFF icon Ie and the playback number icon If) is displayed at the bottom on the main display 10, too.

Next, in the list of the sound text segments 920 displayed on the main display 10, the sound text segment 920 displayed first (on the top of the list) on the main display 10, "What's taking my girl so long to come out?", is specified as the specific sound text segment 920S, and the video repeat learning icon Ic displayed at the beginning of the specific sound text segment 920S is highlighted (Step S32).

Figure 12A:
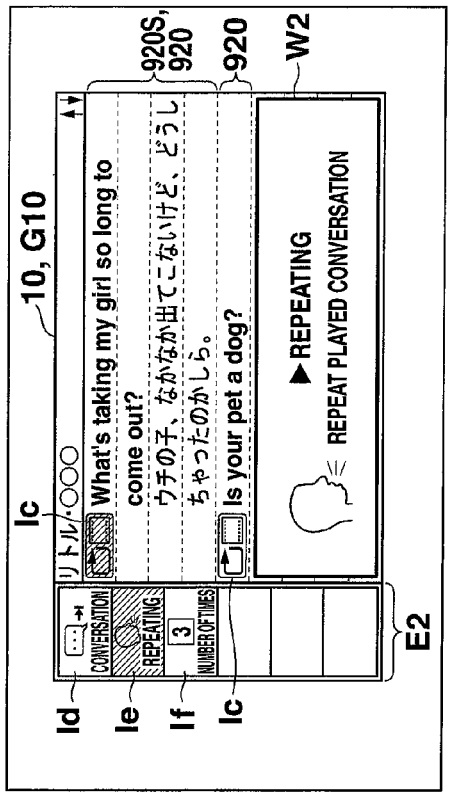
FIGS. 12A to 12D show contents displayed on the display unit.

Next, as shown in FIG. 12A, when the user touches the repetition ON/OFF icon Ie and the playback number icon If (Step S33; YES), the set contents for the video repeat learning mode are changed in response to the touch operations, namely, the set contents of the with-or-without repetition and the playback number are changed to "YES" (ON) and "3", respectively, and the contents displayed on the main display 10 with respect to the repetition ON/OFF icon Ie and the playback number icon If are updated (Step S34).

Figure 12B:
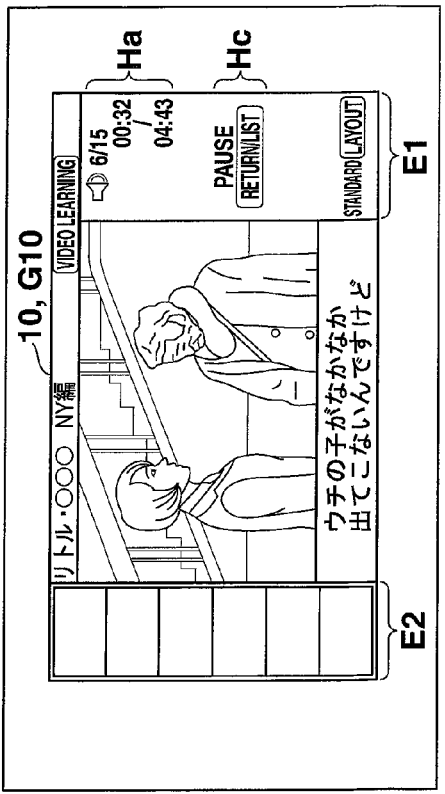

Next, as shown in FIG. 12B, when the user operates the decision key 2b (Step S38; YES), it is determined that the with-or-without repetition is set to ON (Step S40; YES), and a sound-attached video segment 910 for the specific sound text segment 920S "What's taking my girl so long to come out?" is set as the specific sound-attached video segment 910S (Step T1). At the time, the list of the sound text segments 920, which are displayed on the main display 10, is deleted from the main display 10, the information display area E1 is formed at the edge part on the right on the main display 10, and the icons (the specific conversational sentence video playback execution icon Id, the repetition ON/OFF icon Ie and the playback number icon If), which are displayed in the icon display area E2, are deleted therefrom.

Next, the specific sound-attached video segment 910S is played (Step T2), and the display item Ha about the state of video playback and the explanation Hc about the operations during video playback are displayed in the information display area E1 (Steps T3 and T4). At the time, the explanation Hb about the operations specific to the normal playback mode (the explanation that an operation on the right arrow of the cursor key 2e corresponds to an operation for a fast-forwarding command and the like) is not displayed in the information display area E1.

Figure 12C:
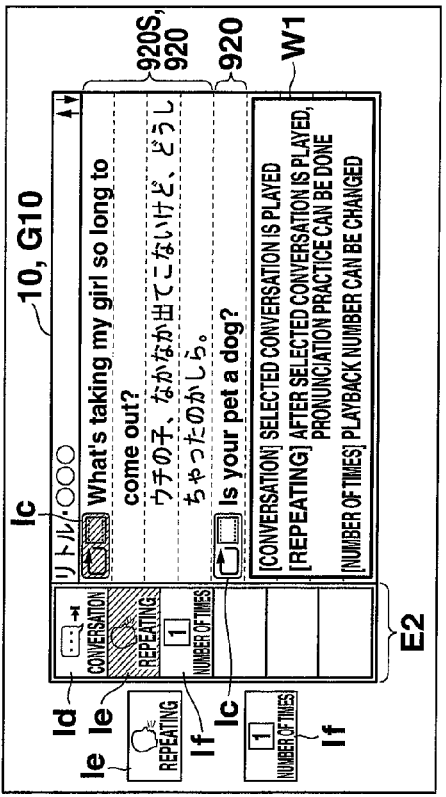

When the user does not operate the return key 2g to make a pause command (Step T5; NO), and the specific sound-attached video segment 910S has been played to the end (Step T6; YES), as shown in FIG. 12C, the video (still image), which is displayed on the main display 10, is deleted from the main display 10, and the sound text segments 920 for the respective sound-attached video segments 910 are displayed on the main display 10 in a list form in order with the specific sound text segment 920S "What's taking my girl so long to come out?" displayed first (Step U1). At the time, the information display area E1, which is formed on the main display 10, is deleted from the main display 10, and accordingly, the display item Ha about the state of video playback and the explanation Hd about the operations during pause are deleted from the main display 10. Further, the playback execution icon Ia, which is displayed in the icon display area E2 at the time when the specific sound-attached video segment 910S has been played to the end, is deleted therefrom. Further, the specific conversational sentence video playback execution icon Id is displayed and highlighted in the icon display area E2, and the repetition ON/OFF icon Ie and the playback number icon If are displayed in the icon display area E2. Further, the explanation window W1 for explaining the functions of these icons (the specific conversational sentence video playback execution icon Id, the repetition ON/OFF icon Ie and the playback number icon If) is displayed at the bottom on the main display 10.

Next, a message "Repeating: Repeat the played conversation." to urge a user to repeat the specific sound text segment 920S is displayed on the main display 10 (Step U2). Following the message, the user reads aloud or silently the specific sound text segment 920S, thereby repeating the sound content of the specific sound-attached video segment 910S.

Figure 12D:
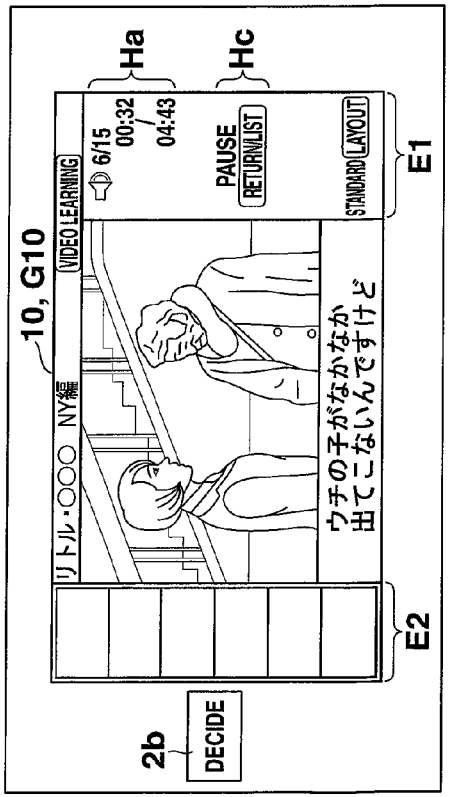

When a time equal to the required playback time for the specific sound-attached video segment 910S has elapsed (Step U4; YES), it is determined that the specific sound-attached video segment 910S has not been played three times indicated by the playback number yet (Step S43; NO) and then it is determined that the with-or-without repetition is set to ON (Step S40; YES), and the sound-attached video segment 910 for the specific sound text segment 920S "What's taking my girl so long to come out?" is set as the specific sound-attached video segment 910S again (Step T1). At the time, as shown in FIG. 12D, the list of the sound text segments 920, which are displayed on the main display 10, is deleted from the main display 10, the information display area E1 is formed at the edge part on the right on the main display 10, and the icons (the specific conversational sentence video playback execution icon Id, the repetition ON/OFF icon Ie and the playback number icon If), which are displayed in the icon display area E2, are deleted therefrom.

Next, the specific sound-attached video segment 910S is played (Step T2), and the display item Ha about the state of video playback and the explanation Hc about the operations during video playback are displayed in the information display area E1 (Steps T3 and T4). At the time, the explanation Hb about the operations specific to the normal playback mode (the explanation that an operation on the right arrow of the cursor key 2e corresponds to an operation for a fast-forwarding command and the like) is not displayed in the information display area E1.

After that, in the same manner as that described above, as long as the user does not operate the return key 2g to make a pause command (Step T5; NO), the state shown in FIG. 12C (or 12B) and the state shown in FIG. 12D alternate three times in total (Steps S41 to S43), and then as shown in FIG. 12A, the sound text segments 920 for the respective sound-attached video segments 910 are displayed on the main display 10 in a list form in order with the specific sound text segment 920S "What's taking my girl so long to come out?" displayed first (Step S50).

According to the electronic dictionary 1, as shown, for example, in FIG. 4 (Steps S21 and S24), 8A, 8B and 10B, when a sound-attached video 91 is paused on the basis of a user operation, a sound text segment 920 for a sound-attached video segment 910 including the paused point is read and displayed, and the sound-attached video 91 restarts from the paused point on the basis of a user operation. Accordingly, separate times, namely, the time to study by watching and listening to a sound-attached video 91 and the time to study by looking at a sound text for the watched and listened part, can be obtained. Therefore, as compared with studying by watching and listening to a sound-attached video 91 while looking at subtitles (same language subtitles) in the language of the sounds of the sound-attached video 91, which is conventionally performed, the learning effect of the sound-attached video 91, which a user watches and listens to, can be high.

Further, with an operation for a pause command and an operation for a playback restart command, only when a sound content of a sound-attached video 91 cannot be understood, a text for the sound can be displayed. Accordingly, as compared with rewinding a sound-attached video 91 when coming across a part the sound content of which cannot be understood, playing the sound-attached video 91 with the same language subtitles from the not-understood part and then playing the sound-attached video 91 without the same language subtitles from the following part, the operation can be simple.

Thus, the learning effect of the sound-attached video 91, which a user watches and listens to, can be easily increased.

Further, as shown, for example, in FIG. 4 (Step S21) and 8B, when a sound-attached video 91 is paused, the sound text segments 920 for the respective sound-attached video segments 910 of the sound-attached video 91 are displayed on the main display 10 in a list form. Accordingly, even when the sound-attached video 91 could not be paused at the not-understood part (point) and accordingly keeps being played, it is possible to search the list of the sound text segments 920 for a sound text segment 920 of the not-understood part to study.

Further, as shown, for example, in FIG. 4 (Step S26), FIG. 5 (Steps S37, S41 and S45) and FIGS. 8D to 9D, when a sound text segment 920 is specified in the list of the sound text segments 920 as the specific sound text segment 920S, the specific sound-attached video segment 910S for the specific sound text segment 920S is played. Accordingly, the sound-attached video segment 910 of the not-understood part can be watched and listened to again.

Further, as shown, for example, in FIG. 4 (Step S24), 8A, 8B and 10B, after the not-understood part (sound-attached video segment 910) is played, the sound-attached video 91 restarts from the paused point. Accordingly, parts of the sound-attached video 91 which have already been watched and listened to, thereby having been studied, can be prevented from being played again.

Further, as shown, for example, in FIG. 3 (Steps S3 to S5), FIG. 6 (Steps T3 and T4), FIG. 8A and FIG. 9B, when a sound-attached video 91 is played and/or when a sound-attached video segment 910 is played, a mark(s) (in the embodiment, the explanation Hb about the operations specific to the normal playback mode) to recognize which is played, the sound-attached video 91 or the sound-attached video segment 910, is displayed. Accordingly, a user can recognize whether he/she is watching and listening to the sound-attached video 91 or a part of the sound-attached video 91, namely, a sound-attached video segment 910.

Further, as shown, for example, in FIG. 3 (Step S14), FIG. 6 (Step T13), FIG. 8B and FIG. 9C, when a sound-attached video 91 is paused and/or when a sound-attached video segment 910 is paused, a mark(s) (in the embodiment, the text display icon Ib) to recognize which is paused, the sound-attached video 91 or the sound-attached video segment 910, is displayed. Accordingly, a user can recognize whether he/she is watching and listening to the sound-attached video 91 and going to look at a text(s) or watching and listening to apart of the sound-attached video 91, namely, a sound-attached video segment 910, and going to look at a text(s).

Further, as shown, for example, in FIG. 4 (Step S24), FIG. 6 (Step T6) and FIGS. 8A to 12D, texts are prevented from being displayed during video playback. Accordingly, the separate times, namely, the time to study by watching and listening to a sound-attached video 91 and the time to study by looking at a sound text for the watched and listened part, can be obtained for sure. Therefore, as compared with studying by watching and listening to a sound-attached video 91 while looking at the same language subtitles, which is conventionally performed, the learning effect of the sound-attached video 91, which a user watches and listens to, can be high for sure.

Further, as shown, for example, in FIG. 4 (Step S21), FIG. 6 (Step T18) and FIGS. 8A to 12D, an image of a sound-attached video 91 or an image of a sound-attached video segment 910, which is displayed on the main display 10, is deleted from the main display 10, and then the sound text segments 920 are displayed thereon. Accordingly, user's concentration can be prevented from being divided into concentration on a text and concentration on an image, for example, when it is time for the user to study by looking at the text.

[Modification]

Next, a modification from the embodiment of the present invention is described. The components which are the same as those of the embodiment receive the same reference symbols, and description thereof is omitted.

Figure 13:
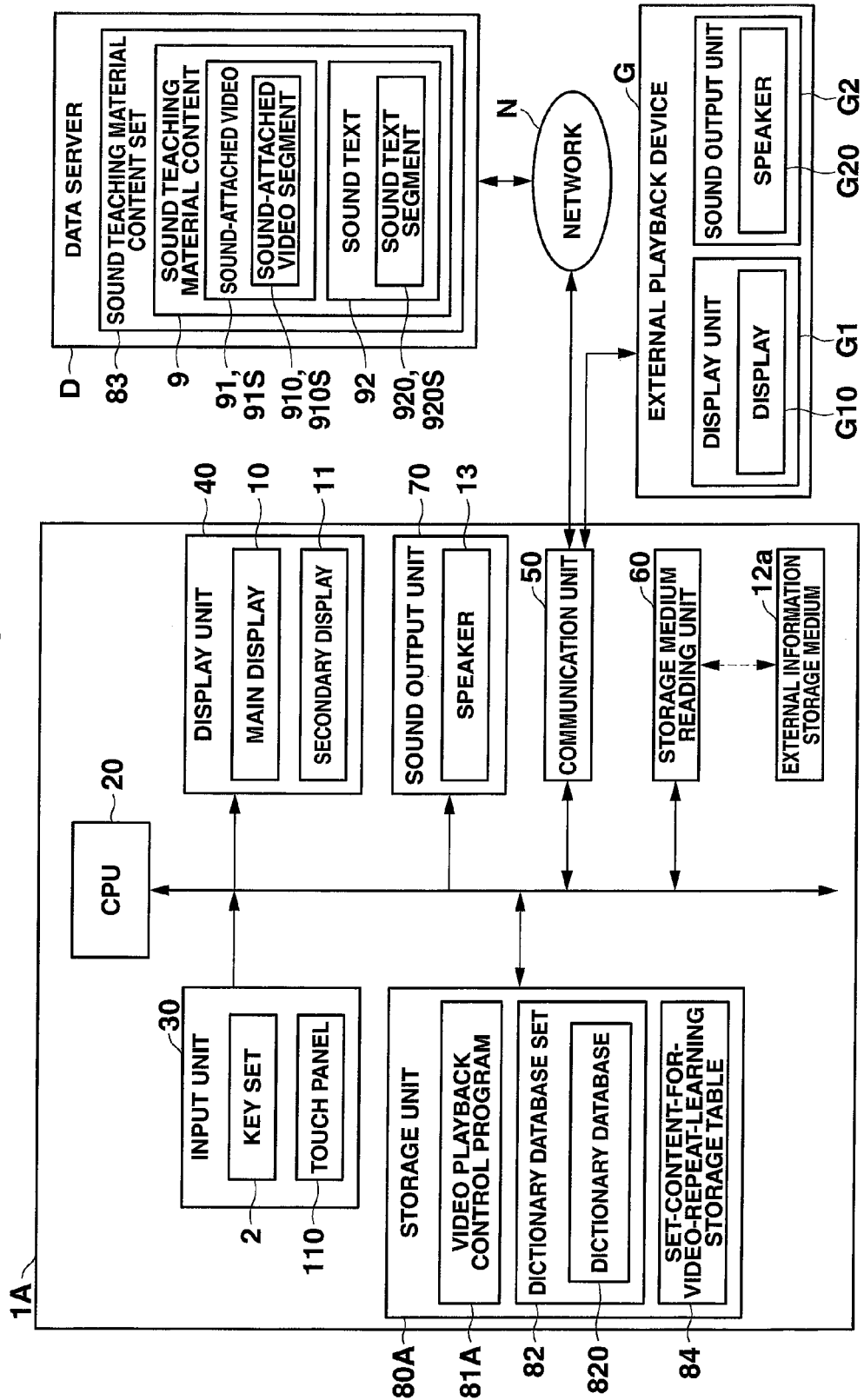
FIG. 13 is a block diagram showing the internal configuration of an electronic dictionary and so forth according to a modification of the present invention.

As shown in FIG. 13, an electronic dictionary 1A of the modification includes a communication unit 50 and a storage unit 80A.

The communication unit 50 is connectable to a network N and thereby can communicate with an external device such as a data server D connected to the network N. The data server D stores therein the sound teaching material content set 83 and the like.

The communication unit 50 is also connectable with an external playback device G. The external playback device G includes a display unit G1 and a sound output unit G2. The display unit G1 includes a display G10 which is the same as the main display 10 of the embodiment, and the display G10 displays various pieces of information thereon on the basis of display signals input thereinto. The sound output unit G2 includes a speaker G20 which is the same as the speaker 13 of the embodiment, and the speaker G20 outputs sounds on the basis of sound output signals input thereinto.

The storage unit 80A stores therein a video playback control program 81A of the present invention.

The video playback control program 81A is a program for the CPU 20 to perform sound learning processing (see FIGS. 3 to 5) which is the same as that of the embodiment.

However, in the sound learning processing performed through the video playback control program 81A of the modification, the CPU 20 obtains the sound teaching material content set 83 and the sound teaching material contents 9, the sound-attached videos 91, the titles of the sound-attached videos 91, the sound-attached video segments 910, the sound texts 92, the sound text segments 920 and the like which are included in the sound teaching material content set 83 from the data server D via the communication unit 50, not from the storage unit 80A.

Further, in the modification, the CPU 20 controls not the display unit 40 and the sound output unit 70 of the electronic dictionary 1A but the display unit G1 and the sound output unit G2 of the external playback device G via the communication unit 50 to play a sound-attached video 91 or a sound-attached segment 910. The communication unit 50 performs wireless communication such as WiFi communication or wired communication using a cable.

Further, in the modification, the CPU 20 controls not the display unit 40 and the sound output unit 70 of the electronic dictionary 1A but the display unit G1 and the sound output unit G2 of the external playback device G via the communication unit 50 to pause the sound-attached video 91 (or the sound-attached video segment 910) and restart the sound-attached video 91 from the paused point.

Further, in the modification, the CPU 20 controls not the display unit 40 of the electronic dictionary 1A but the display unit G1 of the external playback device G via the communication unit 50 to display the title of a sound-attached video 91, a sound text 92 or a sound text segment 920 and also to display the titles of sound-attached videos 91 in a list form or sound text segments 920 in a list form.

The electronic dictionary 1A of the modification can obtain the same advantageous effects as those obtained by the electronic dictionary 1 of the embodiment.

The present invention is not limited to the embodiment or the modification described above and hence can be appropriately modified without departing from the scope or spirit of the present invention.

For example, in the above, the video playback device of the present invention is described as the electronic dictionary 1 or 1A. However, the present invention is not limited thereto and hence can be applicable, for example, to a tablet personal computer (or a smartphone) 1B shown in FIG. 1B, a personal computer 1C shown in FIG. 1C connected to the external playback device G and other electronic devices such as a desktop personal computer, a laptop personal computer, a mobile phone, a PDA (Personal Digital Assistant) and a game machine. Further, the video playback program 81 and the video playback control program 81A of the present invention may be stored in memory cards, CDs or the like which are attachable/detachable to/from the electronic dictionaries 1 and 1A.

Further, after the sound text segments 920 are displayed on the main display 10, for example, at Step S21, S42, S50, T18 or U1, what is called jump search may be performed on a word in the sound text segments 920 on the basis of a user operation. In addition, after the jump search, the electronic dictionary 1 (the main display 10) may return to the state immediately before the jump search by a user operating the return key 2g or the like. In this case, even after the jump search, the specific sound-attached video 91S can restart from the paused point, at which the specific sound-attached video 91S is paused at Step S11, at Step S24.

In the above, the embodiment and the modification are described. However, the scope of the present invention is not limited thereto but includes the scope of claims attached below and the scope of their equivalents.

What is claimed is:

1. A video playback device comprising:
   a sound-attached video storage unit in which a sound-attached video is stored;
   a text storage unit in which texts for sounds of sound-attached video portions of the sound-attached video are stored in such a way as to be correlated with the respective sound-attached video portions;
   a sound-attached video playback control unit which controls to play the sound-attached video on the basis of a user operation;
   a pause control unit which controls to pause the sound-attached video on the basis of a user operation while the sound-attached video is played by the sound-attached video playback control unit;
a text display control unit which, when the sound-attached video is paused by the pause control unit, controls to read from the text storage unit a text correlated with a sound-attached video portion including a point at which the sound-attached video is paused by the pause control unit so as to display the text; and
a playback restart control unit which controls to restart the sound-attached video from the paused point on the basis of a user operation.

2. The video playback device according to claim 1, wherein the text display control unit includes a text list display control unit which, when the sound-attached video is paused by the pause control unit, controls to read from the text storage unit the texts correlated with the respective sound-attached video portions so as to display the texts as a list in order with the text correlated with the sound-attached video portion including the paused point displayed first, and the video playback device further comprises:
a text specification unit which specifies a text in the displayed list of the texts as a specific text on the basis of a user operation; and
a video-portion-for-specific-text playback control unit which controls to play a sound-attached video portion correlated with the specific text, and
the playback restart control unit restarts the sound-attached video from the paused point on the basis of a user operation after the sound-attached video portion is played by the video-portion-for-specific-text playback control unit.

3. The video playback device according to claim 2 further comprising a playback recognition mark display control unit which controls to display a mark to recognize which is played, the sound-attached video or the sound-attached video portion, when the sound-attached video is played and/or when the sound-attached video portion is played.

4. The video playback device according to claim 2 further comprising:
a video portion pause control unit which controls to pause the sound-attached video portion on the basis of a user operation while the sound-attached video portion is played by the video-portion-for-specific-text playback control unit; and
a pause recognition mark display control unit which controls to display a mark to recognize which is paused, the sound-attached video or the sound-attached video portion, when the sound-attached video is paused and/or when the sound-attached video portion is paused.

5. The video playback device according to claim 1, wherein the text display control unit includes a text display prevention control unit which controls to prevent the text from being displayed while the sound-attached video is played.

6. The video playback device according to claim 1, wherein the text display control unit controls to hide a displayed image of the sound-attached video played by the sound-attached video playback control unit and display the text.

7. A video playback method for a computer including: a sound-attached video storage unit in which a sound-attached video is stored; and a text storage unit in which texts for sounds of sound-attached video portions of the sound-attached video are stored in such a way as to be correlated with the respective sound-attached video portions, the video playback method comprising:
controlling to play the sound-attached video on the basis of a user operation;
controlling to pause the sound-attached video on the basis of a user operation while the sound-attached video is played;
when the sound-attached video is paused, controlling to read from the text storage unit a text correlated with a sound-attached video portion including a point at which the sound-attached video is paused; and
controlling to restart the sound-attached video from the paused point on the basis of a user operation.

8. A non-transitory storage medium having stored thereon a video playback program for a computer including: a sound-attached video storage unit in which a sound-attached video is stored; and a text storage unit in which texts for sounds of sound-attached video portions of the sound-attached video are stored in such a way as to be correlated with the respective sound-attached video portions,
the video playback program causing the computer to function as:
a sound-attached video playback control unit which controls to play the sound-attached video on the basis of a user operation;
a pause control unit which controls to pause the sound-attached video on the basis of a user operation while the sound-attached video is played by the sound-attached video playback control unit;
a text display control unit which, when the sound-attached video is paused by the pause control unit, controls to read from the text storage unit a text correlated with a sound-attached video portion including a point at which the sound-attached video is paused by the pause control unit so as to display the text; and
a playback restart control unit which controls to restart the sound-attached video from the paused point on the basis of a user operation.

9. A video playback control device comprising:
a sound-attached video obtaining unit which obtains sound-attached video portions of a sound-attached video;
a text obtaining unit which obtains texts for sounds of the sound-attached video portions;
a sound-attached video playback control unit which controls to play the sound-attached video on the basis of a user operation;
a pause control unit which controls to pause the sound-attached video on the basis of a user operation while the sound-attached video is played by the sound-attached video playback control unit;
a text display control unit which, when the sound-attached video is paused by the pause control unit, controls to obtain through the text obtaining unit a text correlated with a sound-attached video portion including a point at which the sound-attached video is paused by the pause control unit so as to display the text; and
a playback restart control unit which controls to restart the sound-attached video from the paused point on the basis of a user operation.

10. The video playback control device according to claim 9, wherein
the sound-attached video obtaining unit includes a sound-attached video receiving unit which receives and obtains the sound-attached video portions from an external device by communicating with the external device, and
the text obtaining unit includes a text receiving unit which receives and obtains the texts from the external device by communicating with the external device.

11. The video playback control device according to claim 9, wherein
the sound-attached video playback control unit includes a sound-attached video playback external control unit which controls to play the sound-attached video on an external device,
the pause control unit includes a pause external control unit which controls to pause the sound-attached video on the external device,
the text display control unit includes a text display external control unit which controls to display the text on the external device, and
the playback restart control unit includes a playback restart external control unit which controls to restart the sound-attached video on the external device.

12. A video playback control method comprising:
obtaining sound-attached video portions of a sound-attached video;
obtaining texts for sounds of the sound-attached video portions;
controlling to play the sound-attached video on the basis of a user operation;
controlling to pause the sound-attached video on the basis of a user operation while the sound-attached video is played;
when the sound-attached video is paused, controlling to obtain a text correlated with a sound-attached video portion including a point at which the sound-attached video is paused so as to display the text; and
controlling to restart the sound-attached video from the paused point on the basis of a user operation.

13. A non-transitory storage medium having stored thereon a video playback control program for a computer including: a sound-attached video obtaining unit which obtains sound-attached video portions of a sound-attached video; and a text obtaining unit which obtains texts for sounds of the sound-attached video portions,
the video playback control program causing the computer to function as:
a sound-attached video playback control unit which controls to play the sound-attached video on the basis of a user operation;
a pause control unit which controls to pause the sound-attached video on the basis of a user operation while the sound-attached video is played by the sound-attached video playback control unit;
a text display control unit which, when the sound-attached video is paused by the pause control unit, controls to obtain through the text obtaining unit a text correlated with a sound-attached video portion including a point at which the sound-attached video is paused by the pause control unit so as to display the text; and
a playback restart control which controls to restart the sound-attached video from the paused point on the basis of a user operation.

* * * * *